(12) United States Patent  
Matthews et al.

(10) Patent No.: US 7,389,358 B1  
(45) Date of Patent: Jun. 17, 2008

(54) DISTRIBUTED VIRTUAL SYSTEM TO SUPPORT MANAGED, NETWORK-BASED SERVICES

(75) Inventors: Abraham R. Matthews, San Jose, CA (US); Naveed Alam, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 322 days.

(21) Appl. No.: 09/661,130

(22) Filed: Sep. 13, 2000

(51) Int. Cl.  
*G06F 15/173* (2006.01)

(52) U.S. Cl. ...................... 709/238; 709/226

(58) Field of Classification Search ........ 709/201–205, 709/238, 223, 224, 226; 370/230, 270, 389, 370/392, 400, 419  
See application file for complete search history.

(56) References Cited

U.S. PATENT DOCUMENTS

| | | | |
|---|---|---|---|
| 4,667,287 A | | 5/1987 | Allen et al. |
| 5,490,252 A | * | 2/1996 | Macera et al. ............... 709/249 |
| 5,550,816 A | | 8/1996 | Hardwick et al. |
| 5,581,705 A | * | 12/1996 | Passint et al. ............... 709/200 |
| 5,841,973 A | | 11/1998 | Kessler et al. |
| 5,964,847 A | | 10/1999 | Booth et al. |
| 6,047,330 A | | 4/2000 | Stracke, Jr. |
| 6,175,867 B1 | * | 1/2001 | Taghadoss .................. 709/223 |
| 6,243,580 B1 | | 6/2001 | Garner |
| 6,260,072 B1 | * | 7/2001 | Rodriguez-Moral ........ 709/241 |
| 6,453,406 B1 | | 9/2002 | Sarnikowski et al. |
| 6,463,061 B1 | * | 10/2002 | Rekhter et al. ............. 370/392 |
| 6,466,976 B1 | | 10/2002 | Alles et al. |
| 6,532,088 B1 | | 3/2003 | Dantu et al. |
| 6,553,423 B1 | | 4/2003 | Chen |
| 6,609,153 B1 | * | 8/2003 | Salkewicz .................. 709/223 |
| 6,658,013 B1 | | 12/2003 | de Boer et al. |
| 6,668,282 B1 | | 12/2003 | Booth et al. |
| 6,674,756 B1 | * | 1/2004 | Rao et al. ................... 709/229 |
| 6,738,821 B1 | | 5/2004 | Wilson et al. |

(Continued)

OTHER PUBLICATIONS

Kapustka, K., et al., "CoSine Communications Moves VPNs 'Into the Cloud' with the Leading Managed IP Service Delivery Platform", *CoSine Communications* http://www.cosinecom.com/news/pr_5_24.html, 5 p., (1999).

(Continued)

*Primary Examiner*—William C. Vaughn, Jr.  
*Assistant Examiner*—Joseph R Maniwang  
(74) *Attorney, Agent, or Firm*—Hamilton, DeSanctis & Cha LLP

(57) ABSTRACT

Methods and systems for allocating network resources are provided. According to one embodiment, a VR-based switch is configured for operation at a POP of a service provider. A NOS is provided on each processing element of the switch. Resources of the switch are segmented among multiple subscribers by associating sets of VRs with a first and second subscriber, mapping the sets of VRs onto sets of the processing elements, and configuring a first and second set of customized services, each including two or more of firewalling, virtual private networking, encryption, traffic shaping, routing and NAT, to be provided by the switch on behalf of the first and second subscribers, respectively, by allocating first and second service object groups within sets of VRs. Each service object can be dynamically distributed by the NOS to customized processors of the first or second set of processing elements to achieve desired computational support.

20 Claims, 13 Drawing Sheets

U.S. PATENT DOCUMENTS

| | | | |
|---|---|---|---|
| 6,775,267 B1 | 8/2004 | Kung et al. | |
| 6,778,502 B2 | 8/2004 | Ricciulli | |
| 6,789,118 B1* | 9/2004 | Rao | 709/225 |
| 6,816,462 B1 | 11/2004 | Booth et al. | |
| 6,885,667 B1* | 4/2005 | Wilson | 370/392 |
| 6,894,994 B1 | 5/2005 | Grob et al. | |
| 6,907,039 B2 | 6/2005 | Shen | |
| 6,922,774 B2 | 7/2005 | Meushaw et al. | |
| 6,934,292 B1* | 8/2005 | Ammitzboell | 370/400 |
| 6,985,447 B2* | 1/2006 | Gibson et al. | 370/255 |
| 6,990,103 B1 | 1/2006 | Gollamundi | |
| 7,003,581 B1* | 2/2006 | Lamberton et al. | 709/238 |
| 7,082,477 B1 | 7/2006 | Sadhasivam et al. | |
| 7,096,495 B1 | 8/2006 | Warrier et al. | |
| 7,111,072 B1* | 9/2006 | Matthews et al. | 709/238 |
| 7,116,679 B1* | 10/2006 | Ghahremani | 370/463 |
| 7,221,945 B2 | 5/2007 | Milford | |
| 7,225,259 B2 | 5/2007 | Ho et al. | |
| 7,316,029 B1 | 1/2008 | Parker et al. | |
| 7,324,889 B2 | 1/2008 | Lyer | |
| 2001/0028636 A1 | 10/2001 | Skog et al. | |
| 2002/0062344 A1* | 5/2002 | Ylonen et al. | 709/204 |
| 2002/0085559 A1* | 7/2002 | Gibson et al. | 370/392 |
| 2004/0095932 A1 | 5/2004 | Astarabadi et al. | |
| 2005/0213589 A1 | 9/2005 | Shih | |

OTHER PUBLICATIONS

Gasparro, D. M., "Next-Gen VPNs: The Design Challenge", *Data Communications*, (Sep. 1999),pp. 83-84, 86, 88, 90, 93, 95.

Rao, J. R., "Intranets and VPNs: Strategic Approach", *1998 Annual Review of Communications*, (1998),669-674.

Notice of Allowance dated Dec. 1, 2004 for U.S. Appl. No. 09/661,636.
Amendment and Response filed on Sep. 2, 2004 for U.S. Appl. No. 09/661,636.
Office Action dated May 28, 2004 for U.S. Appl. No. 09/661,636.
Amendment and Response filed on Mar. 22, 2004 for U.S. Appl. No. 09/661,636.
Office Action dated Nov. 18, 2003 U.S. Appl. No. 09/661,636.
Amendment and Response filed on Jun. 20, 2007 for U.S. Appl. No. 09/661,637.
Office Action dated Feb. 8, 2007 for U.S. Appl. No. 09/661,637.
Amendment and Response filed on Mar. 6, 2006 for U.S. Appl. No. 09/661,637.
Office Action dated Dec. 23, 2004 for U.S. Appl. No. 09/661,637.
Amendment and Response filed on Aug. 5, 2004 for U.S. Appl. No. 09/661,637.
Office Action dated May 5, 2004 for U.S. Appl. No. 09/661,637.
Notice of Allowance dated Jun. 14, 2007 for U.S. Appl. No. 10/067,106.
Amendment and Response filed on Mar. 10, 2007 for U.S. Appl. No. 10/067,106.
Office Action dated Nov. 16, 2006 for U.S. Appl. No. 10/067,106.
Amendment and Response filed on Aug. 28, 2006 for U.S. Appl. No. 10/067,106.
Office Action dated Mar. 27, 2006 for U.S. Appl. No. 10/067,106.
Amendment and Response filed on Nov. 6, 2006 for U.S. Appl. No. 09/663,483.
Office Action dated Jul. 6, 2006 for U.S. Appl. No. 09/663,483.
Amendment and Response filed on Mar. 13, 2006 for U.S. Appl. No. 09/663,483.
Advisory Action dated Nov. 12, 2004 for U.S. Appl. 09/663,483.
Amendment and Response filed on Oct. 8, 2004 for U.S. Appl. No. 09/663,483.
Office Action dated Jun. 3, 2004 for U.S. Appl. No. 09/663,483.
Amendment and Response filed on Feb. 26, 2004 for U.S. Appl. No. 09/663,483.
Office Action dated Aug. 21, 2003 for U.S. Appl. No. 09/663,483.
Amendment and Response filed on Mar. 13, 2006 for U.S. Appl. No. 09/952,520.
Office Action dated Mar. 14, 2005 for U.S. Appl. No. 09/952,520.
Notice of Allowance dated Jul. 30, 2007 for U.S. Appl. No. 09/663,485.
Amendment and Response filed on Jun. 11, 2007 for U.S. Appl. No. 09/663,485.
Office Action dated Jan. 11, 2007 for U.S. Appl. No. 09/663,485.
Amendment and Response filed on Aug. 28, 2006 for U.S. Appl. No. 09/663,485.
Office Action dated Jul. 26, 2007 for U.S. Appl. No. 09/663,485.
Amendment and Response filed on Feb. 2, 2006 for U.S. Appl. No. 09/663,485.
Office Action dated Dec. 21, 2004 for U.S. Appl. No. 09/663,485.
Amendment and Response filed on Nov. 16, 2004 for U.S. Appl. No. 09/663,485.
Office Action dated May 14, 2004 for U.S. Appl. No. 09/663,485.
Amendment and Response filed on Mar. 15, 2004 for U.S. Appl. No. 09/663,485.
Office Action dated Sep. 8, 2003 for U.S. Appl. No. 09/663,485.
Office Action dated Aug. 8, 2007 for U.S. Appl. No. 09/663,457.
Amendment and Response filed on Jul. 11, 2007 for U.S. Appl. No. 09/663,457.
Office Action dated May 17, 2007 for U.S. Appl. No. 09/663,457.
Amendment and Response filed on Oct. 2, 2006 for U.S. Appl. No. 09/663,457.
Office Action dated Apr. 22, 2005 for U.S. Appl. No. 09/663,457.
Office Action dated Aug. 27, 2004 for U.S. Appl. No. 09/663,457.
Amendment and Response filed on Jun. 21, 2004 for U.S. Appl. No. 09/663,457.
Office Action dated Dec. 11, 2003 for U.S. Appl. No. 09/663,457.
Notice of Allowance dated Nov. 21, 2006 for U.S. Appl. No. 09/663,484.
Amendment and Response filed on Aug. 24, 2006 for U.S. Appl. No. 09/663,484.
Office Action dated Feb. 24, 2006 for U.S. Appl. No. 09/663,484.
Amendment and Response filed on Feb. 7, 2006 for U.S. Appl. No. 09/663,484.
Office Action dated Apr. 6, 2005 for U.S. Appl. No. 09/663,484.
Amendment and Response filed on Nov. 12, 2004 for U.S. Appl. No. 09/663,484.
Office Action dated May 6, 2004 for U.S. Appl. No. 09/663,484.
Amendment and Response filed on Feb. 18, 2004 for U.S. Appl. No. 09/663,484.
Office Action dated Aug. 12, 2003 for U.S. Appl. No. 09/663,484.
Notice of Allowance dated Jan. 4, 2007 for U.S. Appl. No. 09/894,471.
Amendment and Response filed on Nov. 2, 2006 for U.S. Appl. No. 09/894,471.
Office Action dated Oct. 26, 2006 for U.S. Appl. No. 09/894,471.
Amendment and Response filed on Mar. 10, 2006 for U.S. Appl. No. 09/894,471.
Office Action dated Dec. 14, 2004 for U.S. Appl. No. 09/894,471.
Notice of Allowance dated Nov. 7, 2006 for U.S. Appl. No. 09/771,346.
Amendment and Response filed on Oct. 18, 2006 for U.S. Appl. No. 09/771,346.
Office Action dated Jul. 18, 2006 for U.S. Appl. No. 09/771,346.
Amendment and Response filed on Mar. 13, 2006 for U.S. Appl. No. 09/771,346.
Office Action dated Jan. 25, 2005 for U.S. Appl. No. 09/771,346.
Amendment and Response filed on Oct. 14, 2004 for U.S. Appl. No. 09/771,346.
Office Action dated Mar. 26, 2004 for U.S. Appl. No. 09/771,346.
Notice of Allowance dated Nov. 19, 2006 for U.S. Appl. No. 10/163,162.
Amendment and Response filed on Aug. 5, 2006 for U.S. Appl. No. 10/163,162.
Office Action dated May 5, 2006 for U.S. Appl. No. 10/163,162.
Notice of Allowance dated Jan. 4, 2007 for U.S. Appl. No. 10/163,261.
Amendment and Response filed on Nov. 9, 2006 for U.S. Appl. No. 10/163,261.
Office Action dated Nov. 3, 2006 for U.S. Appl. No. 10/163,261.

Amendment and Response filed on Aug. 22, 2006 for U.S. Appl. No. 10/163,261.
Office Action dated May 22, 2006 for U.S. Appl. No. 10/163,261.
Notice of Allowance dated Jul. 27, 2006 for U.S. Appl. No. 10/163,073.
Office Action dated May 30, 2007 for U.S. Appl. No. 10/273,669.
Amendment and Response filed on Mar. 9, 2007 for U.S. Appl. No. 10/273,669.
Office Action dated Sep. 21, 2006 for U.S. Appl. No. 10/273,669.
Amendment and Response filed on Jun. 21, 2006 for U.S. Appl. No. 10/273,669.
Office Action dated Feb. 21, 2006 for U.S. Appl. No. 10/273,669.
Notice of Allowance dated Aug. 14, 2007 for U.S. Appl. No. 10/163,071.
Amendment and Response filed on Jul. 17, 2007 for U.S. Appl. No. 10/163,071.
Office Action dated Jul. 3, 2007 for U.S. Appl. No. 10/163,071.
Amendment and Response filed on May 6, 2007 for U.S. Appl. No. 10/163,071.
Office Action dated Nov. 7, 2006 for U.S. Appl. No. 10/163,071.
Amendment and Response filed on Sep. 1, 2006 for U.S. Appl. No. 10/163,071.
Office Action dated Jun. 1, 2006 for U.S. Appl. No. 10/163,071.
Amendment and Response filed on Mar. 6, 2006 for U.S. Appl. No. 10/163,071.
Office Action dated Dec. 2, 2005 for U.S. Appl. No. 10/163,071.
Notice of Allowance dated Nov. 29, 2006 for U.S. Appl. No. 10/163,079.
Amendment and Response filed on Nov. 1, 2006 for U.S. Appl. No. 10/163,079.
Office Action dated Oct. 27, 2006 for U.S. Appl. No. 10/163,079.
Amendment and Response filed on Aug. 17, 2006 for U.S. Appl. No. 10/163,079.
Office Action dated May 17, 2006 for U.S. Appl. No. 10/163,079.
Notice of Allowance dated Jul. 17, 2007 for U.S. Appl. No. 10/298,815.
Amendment and Response filed on Mar. 9, 2007 for U.S. Appl. No. 10/298,815.
Office Action dated Feb. 23, 2007 for U.S. Appl. No. 10/298,815.
Notice of Allowance dated Jun. 27, 2005 for U.S. Appl. No. 10/232,979.
Notice of Allowance dated Jul. 5, 2007 for U.S. Appl. No. 11/466,098.
Amendment and Response filed on Aug. 10, 2007 for U.S. Appl. No. 10/163,260.
Office Action dated Aug. 1, 2007 for U.S. Appl. No. 10/163,260.
Amendment and Response filed on May 23, 2007 for U.S. Appl. No. 10/163,260.
Office Action dated Apr. 13, 2007 for U.S. Appl. No. 10/163,260.
Amendment and Response filed on Mar. 13, 2007 for U.S. Appl. No. 10/163,260.
Office Action dated Dec. 21, 2006 for U.S. Appl. No. 10/163,260.
Amendment and Response filed on Sep. 18, 2006 for U.S. Appl. No. 10/163,260.
Office Action dated May 18, 2006 for U.S. Appl. No. 10/163,260.
Office Action dated Aug. 22, 2007 for U.S. Appl. No. 10/650,298.
Response to Restriction Requirement Apr. 26, 2004 for U.S. Appl. No. 09/663,483.
Restriction Requirement dated Mar. 22, 2004 for U.S. Appl. No. 09/663,483.
Office Action dated Sep. 11, 2007 for U.S. Appl. No. 09/661,637.
Supplemental Amendment and Response filed on Sep. 17, 2007, 2007 for U.S. Appl. No. 09/663,457.
Knight, P., et al. "Network Based IP VPN Architecture Using Virtual Routers." Network Working Group Internet Draft. Mar. 2006.
Andersson, L., et al. "Provider Provisioned Virtual Private Network (VPN) Terminology" Network Working Group Internet Draft. Mar. 2005.
Lawrence, J. Lang et al."Connecting Remote FDDI Installations with Single-Mode Fiber, Dedicated Lines, or SMDS." Jul. 1990; ACM SIGCOMM Computer Communication Review. vol. 20, Issue 3; pp. 72-82.
IEEE Potentials Publication; "Local Area Networks" Dec. 1995/Jan. 1996; p. 6. http://www.ece.uc.edu/-paw/potentials/sample.
Office Action dated Oct. 18, 2007 for U.S. Appl. No. 09/663,483.
Office Action dated Oct. 16, 2007 for U.S. Appl. No. 09/661,130.
Office Action dated Nov. 28, 2007 for U.S. Appl. No. 09/952,520.
A lightweight Protocol for Interconnection Heterogenous Devices in Dynamic Environments, (c) 1999, obtained from the Internet at : http//ieeexplore.ieee.org/iel5/6322/16898/00778477.pdf.
The Guide to Computing Literature, Jairo A.: A Framework and Lightweight Protocol for Multimedia Network Management, vol. 8, Issue 1, published 2000, ISSN: 1064-7570.
Bookfinder4u.com: High Perfromance Networks by Ahmed N. Tantawy, ISBN-10: 0792393716, Published 1993, Lightweight Protocols.
Inpinfusion white paper: Virtual Routing for Provide Edge Application, obtained from the Internet at: http://www.ipinfusion.com/pdf/VirtualRouting_app-note_3rev0302.pdf, pp. 1-8.
Non-Final Office Action for U.S. Appl. No. 10/991,969, dated Feb. 20, 2008.
Non-Final Office Action for U.S. Appl. No. 10/273,669, dated Feb. 20, 2008.
Non-Final Office Action for U.S. Appl. No. 10/949,943 dated Feb. 14, 2008.
Restriction Requirement for U.S. Appl. No. 11/556,697, dated Mar. 13, 2008.

* cited by examiner

ORIGINAL UNFRAGMENTED IP PACKET (MF=0 && OFF=0)

| SRC, DEST, PROTO MF=0, OFF=0 ID=10AF, LEN=1064 | SRC PORT DEST PORT | DATA[0-1023] |

FRAGMENTED IP PACKET (EACH FRAGMENT IS 534 BYTES LONG)

| SRC, DEST, PROTO MF=1, OFF=0 ID=10AF, LEN=512 | SRC PORT DEST PORT | DATA[0-471] | IP FRAGMENT 1 |

| SRC, DEST, PROTO MF=1, OFF=492 ID=10AF, LEN=512 | DATA[472-963] | IP FRAGMENT 2 |

| SRC, DEST, PROTO MF=1, OFF=984 ID=10AF, LEN=80 | DATA[964-1023] | IP FRAGMENT 3 |

FIG.9

DISTRIBUTED VIRTUAL SYSTEM TO SUPPORT MANAGED, NETWORK-BASED SERVICES

FIELD OF THE INVENTION

The present invention is related to networking systems, and more particularly to a system and method for allocating networking resources within a wide area network (WAN).

BACKGROUND INFORMATION

Internet or WAN service providers are operating in a crowded marketplace where cost effectiveness is critical. Operational costs present a significant challenge to service providers. Cumbersome, manual provisioning processes are the primary culprits. Customer orders must be manually entered and processed through numerous antiquated back-end systems that have been pieced together. Once the order has been processed, a truck roll is required for onsite installation and configuration of Customer Premises Equipment (CPE), as well as subsequent troubleshooting tasks.

Presently, the delivery of firewall services requires the deployment of a specialized piece of Customer Premises Equipment (CPE) to every network to be protected. This model of service delivery creates an expensive up-front capital investment, as well as significant operational expenses that are associated with onsite installation and management of thousands of distributed devices. The results are service delivery delays, increased customer start-up costs and/or thinner service provider margins.

The slow and expensive process of deploying firewall services cuts into margins and forces significant up-front charges to be imposed on the customer. In order to be successful in today's market, service providers must leverage the public network to offer high-value, differentiated services that maximize margins while controlling capital and operational costs. These services must be rapidly provisioned and centrally managed so that time-to-market and, more importantly, time-to-revenue are minimized. Traditional methods of data network service creation, deployment, and management present significant challenges to accomplishing these goals, calling for a new network service model to be implemented.

Enterprise customers are increasingly demanding cost-effective, outsourced connectivity and security services, such as Virtual Private Networks (VPNs) and managed firewall services. Enterprise networks are no longer segregated from the outside world; IT managers are facing mounting pressure to connect disparate business units, satellite sites, business partners, and suppliers to their corporate network, and then to the Internet. This raises a multitude of security concerns that are often beyond the core competencies of enterprise IT departments. To compound the problem, skilled IT talent is an extremely scarce resource. Service providers, with expert staff and world-class technology and facilities, are well positioned to deliver these services to enterprise customers.

What is needed is a system and method for providing managed network services that are customizable for each customer's need.

SUMMARY

Methods and systems are described for allocating network resources of a distributed virtual system to support managed, network-based services. According to one embodiment, a virtual router (VR)-based switch having multiple processing elements is provided that is configured for operation at an Internet point-of-presence (POP) of a service provider. A network operating system (NOS) is provided on each of the processing elements. The resources of the VR-based switch are segmented between at least a first subscriber of the service provider and a second subscriber of the service provider by associating a first set of VRs with the first subscriber, associating a second set of VRs with the second subscriber, mapping the first set of VRs onto a first set of the processing elements, mapping the second set of VRs onto a second set of the processing elements. Then, a first and second set of customized services are configured, each including two or more of firewalling, virtual private networking, encryption, traffic shaping, routing and network address translation (NAT), to be provided by the VR-based switch on behalf of the first and second subscriber, respectively. The first set of customized services is configured by allocating a first service object group within the first set of VRs. The first service object group includes a service object corresponding to each service of the first set of customized services and each service object of the first service object group can be dynamically distributed by the NOS to customized processors of the first set of processing elements to achieve desired computational support. The second set of customized services is configured by allocating a second service object group within the second set of VRs. The second service object group includes a service object corresponding to each service of the second set of customized services and each service object of the second service object group can be dynamically distributed by the NOS to customized processors of the second set of processing elements to achieve desired computational support.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 9 illustrates packet fragmentation and header content in accordance with an embodiment of the present invention.

DESCRIPTION OF THE PREFERRED EMBODIMENTS

Figure 1:
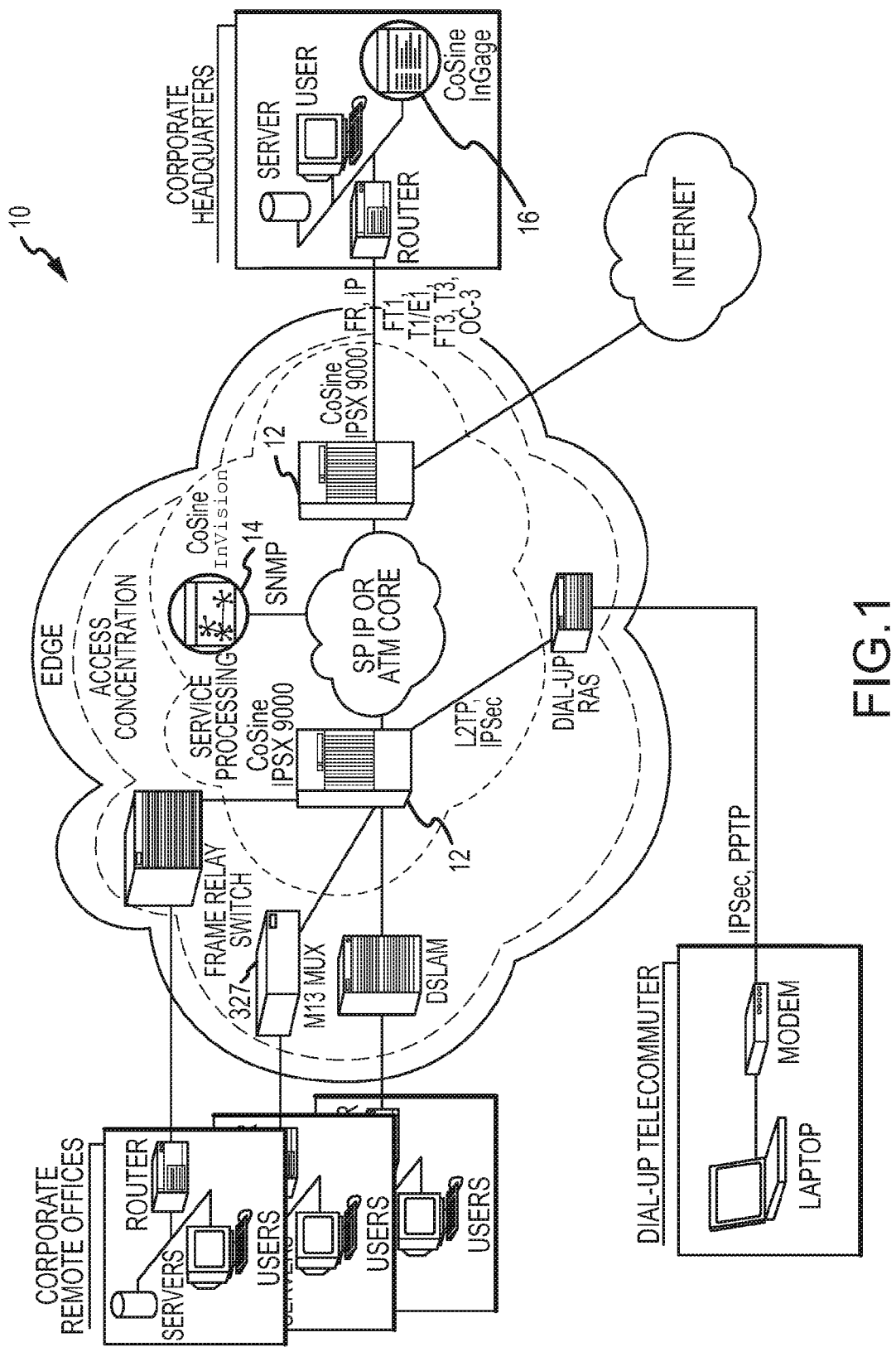
FIG. 1 is a block diagram illustrating an IP Service Delivery Platform in accordance with an embodiment of the present invention.

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

While IT managers clearly see the value in utilizing managed network services, there are still barriers to adoption. Perhaps the most significant of these is the fear of losing control of the network to the service provider. In order to ease this fear, a successful managed network service offering must provide comprehensive visibility to the customer, enabling them to view configurations and performance statistics, as well as to request updates and changes. By providing IT managers with powerful Customer Network Management (CNM) tools, one can bolsters confidence in the managed network service provider and can actually streamline the service provisioning and maintenance cycle.

While service providers recognize the tremendous revenue potential of managed firewall services, the cost of deploying, managing and maintaining such services via traditional CPE-based methods is somewhat daunting. Service providers are now seeking new service delivery mechanisms that minimize capital and operational costs while enabling high-margin, value-added public network services that are easily provisioned, managed, and repeated. Rolling out a network-based managed firewall service is a promising means by which to accomplish this. Deploying an IP Service Delivery Platform in the service provider network brings the intelligence of a managed firewall service out of the customer premises and into the service provider's realm of control.

One such IP Service Delivery Platform 10 is shown in FIG. 1. In the embodiment shown in FIG. 1, IP Service Delivery Platform 10 includes three distinct components: an intelligent, highly scalable IP Service Processing Switch 12, a comprehensive Service Management System (SMS) 14 and a powerful Customer Network Management (CNM) system 16. Service Management System (SMS) 14 is used to enable rapid service provisioning and centralized system management. Customer Network Management (CNM) system 16 provides enterprise customers with detailed network and service performance systems, enable self-provisioning. At the same time, system 16 eases IT managers fears of losing control of managed network services.

Figure 2:
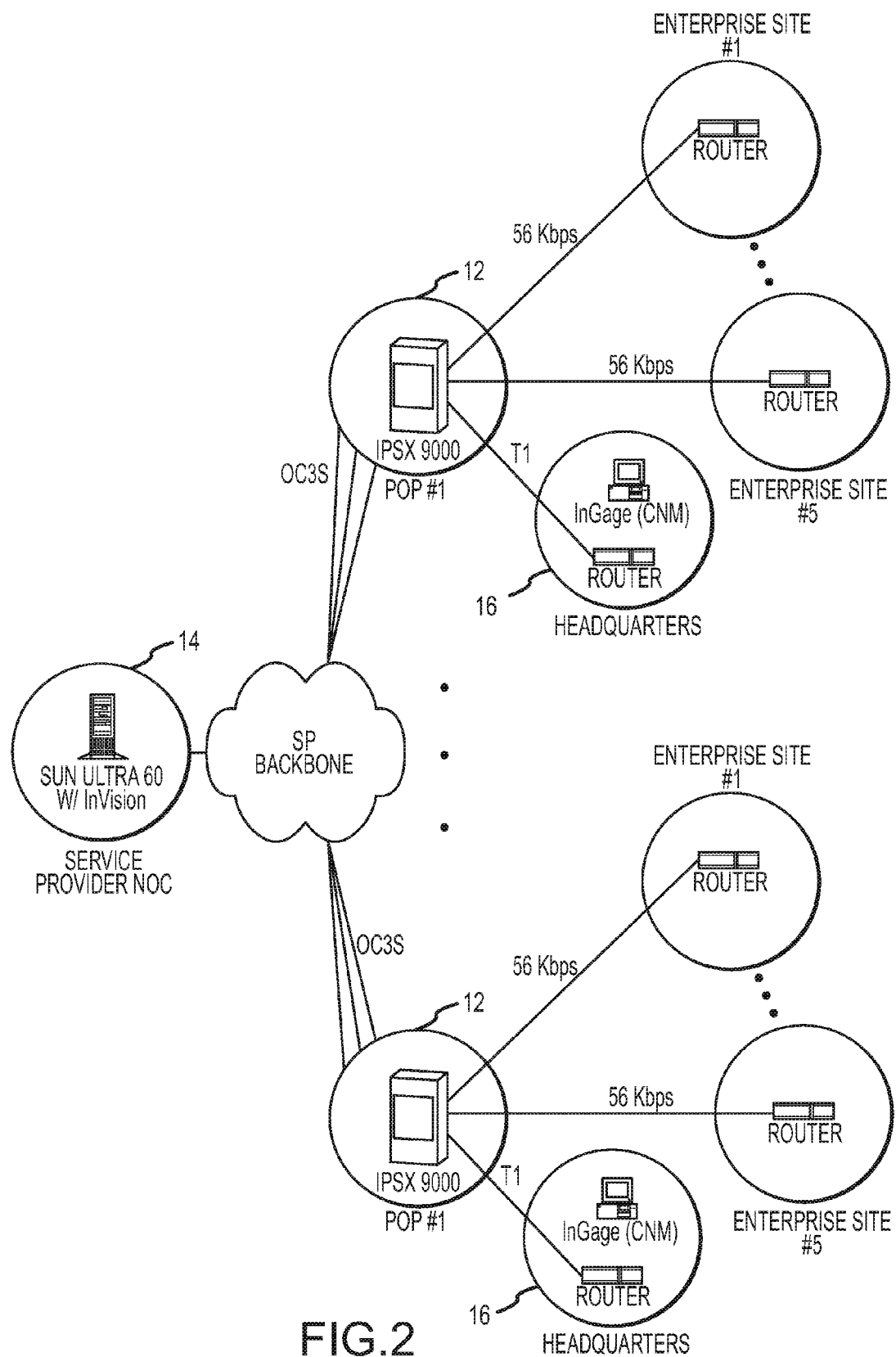
FIG. 2 conceptually illustrates a POP access infrastructure in accordance with a network-based managed firewall service model of an embodiment of the present invention.

In one embodiment, such as is shown in FIG. 2 for a network-based managed firewall service model, the service provider replaces the high-capacity access concentration router at the POP with an IP Service Processing Switch 12. This is a higher-capacity, more robust, and more intelligent access switch, with scalable processing up to 100+ RISC CPUs. Just as with the access router, additional customer access capacity is added via installing additional port access blades to the IP Service Processing Switch chassis. Unlike conventional access routers, however, additional processor blades can be added to switch 12 to ensure wire-speed performance and service processing.

The intelligence resident in IP Service Processing Switch 12 eliminates the need to deploy CPE devices at each protected customer site. Deployment, configuration, and management of the managed firewall service all take place between IP Service Processing Switch 12 and its Service Management System 14. In the embodiment shown in FIG. 2, Service Management System 14 resides on a high-end UNIX platform at the service provider NOC.

In one embodiment, the customer has the ability to initiate service provisioning and augmentation via a web-based Customer Network Management tool residing, e.g., at the customer's headquarters site. This is an entirely different service delivery paradigm, requiring little or no truck rolls and little or no on-site intervention.

In one embodiment, switch 12 is a 26-slot services processing switch that marries scalable switching, routing and computing resources with an open software architecture to deliver computationally-intense IP services such as VPNs with scalable high performance. In one embodiment, switch 12 has a high-speed 22 Gbps redundant dual counter-rotating ring midplane. Slots are configured with four types of Service Blades: Control, Access, Trunk and Processor blades with specialized processing which enables a range of high-performance services including route forwarding, encryption and firewalls.

Service providers can use switch 12's virtual routing capabilities, and its ability to turn IP services into discrete and customized objects, to segment and layer services for the first time for tens of thousands of discrete subscriber corporations. In addition, processor capacity can be added to switch 12 by adding new processor blades.

In one embodiment switch 12 includes an operating system which dynamically distributes services to switch 12 processors.

In one embodiment, the 26-slot services processing switch corrects for failures using the redundant counter-rotating ring midplane.

In one embodiment, each Service Blade automatically fails-over to a backup. One embodiment of a switch 12 is described in "System and Apparatus for Delivering Security Services," filed herewith, the description is incorporated herein by reference.

In one embodiment, switch 12 is designed to integrate seamlessly into a SP's preexisting network, whether that be through support of open routing protocols or through its Frame Relay to IPSec interworking solution that integrates new IP-based networks into a corporation's preexisting Frame Relay cloud.

The operating system will be described next.

In one embodiment, switch 12 includes a network operating system (NOS) 20. In one embodiment, network operating system 20 enables switch 12 to create discrete customized services to specific subscriber corporations by providing them each with a different configuration of service object groups. NOS 20 enables objects within these object groups to be distributed dynamically to customized processors so that application services are receiving the right level of computational support.

In one embodiment, NOS 20 is designed as an open Application Program Interface (API) that allows general-purpose software or new advanced IP services to be ported into the platform from best of breed third parties in a continual fashion, helping to enrich service provider' investment over time.

In one embodiment, NOS 20 includes a distributed messaging layer (DML) 22 component, an object manager (OM) component 24 layered over DML, control blade redundancy (CBR) 26 for redundant system controllers, a resource manager (RM) 28 for managing separate resource elements and a resource location service (RLS) 30. Resource location service 30 provides load balancing across capable processor elements (PEs) to create an object. PE selection is based on predefined constraints.

Figure 3:
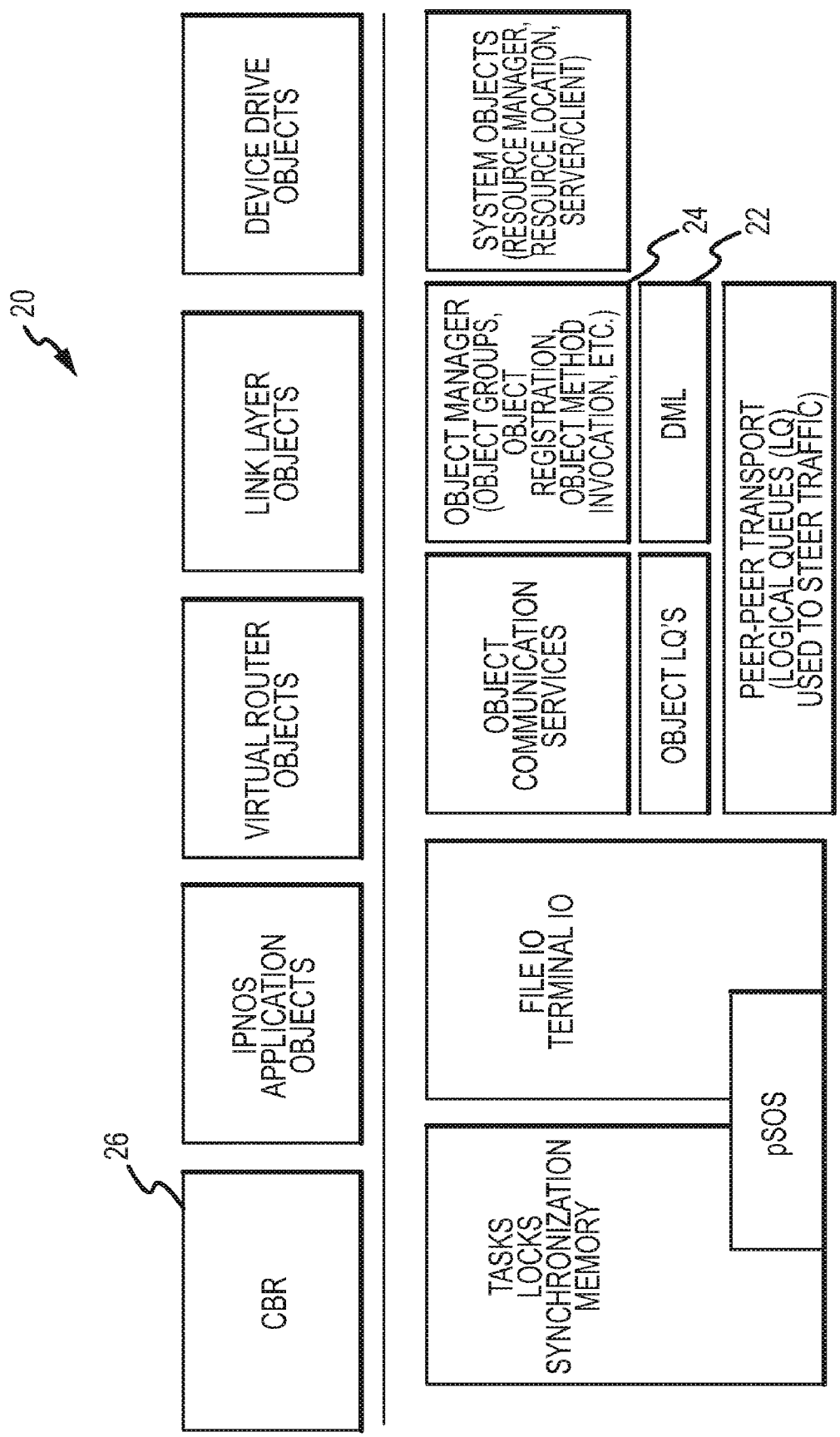
FIG. 3 is a block diagram illustrating various services and functional units of an IPNOS in accordance with an embodiment of the present invention.

In one embodiment, CBR 26 is layered over DML 22 and OM 24 as shown in FIG. 3.

Figure 4:
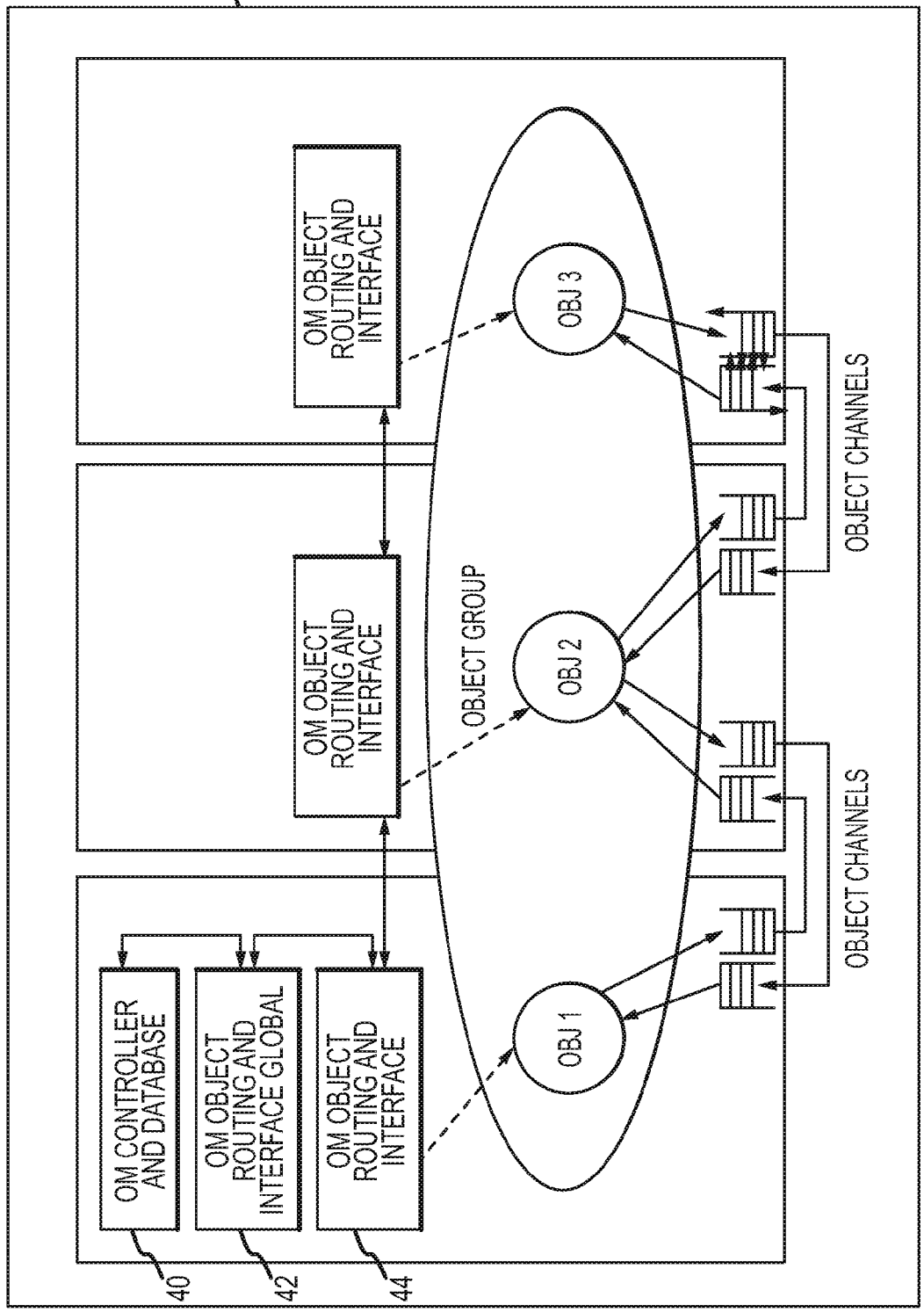
FIG. 4 conceptually illustrates interactions among various Object Manager layers in accordance with an embodiment of the present invention.

In one embodiment, Object Manager 24 consists of three layers as shown on FIG. 4. The upper layer titled OM Controller and Database (OMCD) 40 is concerned with managing the VPN and VR configuration. This is the agent that deals with the configuration manager directly. Middle layer 42 entitled OM Object Routing and Interface Global is concerned with managing global (across the switch system) object groups and object configurations. Lower layer 44 entitled OM Object Routing and Interface (OMORI) is concerned with managing local objects and groups as well as routing control information between address spaces based on the location of objects, and interfacing with the object via method invocation.

In one embodiment, the IPSX object database consists of two types of databases: Global (managed on Master Control Blade by OMORIG) and distributed local databases (managed by OMORI agents on every PE present in the system). In one such embodiment, the global database is a superset of the extracts from local databases.

One such network operating system 20 is described in "Switch Management System and Method," filed herewith, the description of which is incorporated herein by reference.

In one embodiment, objects represent a basic unit of management for purposes of fault tolerance, computational load balancing, etc. One or more adjacent protocol modules can be placed into a single object. In addition, it is also possible that a module can be split across two objects.

In one embodiment, virtual routers (VRs) are mapped onto the physical processor elements of switch 12. In one such embodiment, each VR is logical mirror of a stand-alone hardware router. The virtual router (VR) construct is at the heart of the system 10 service segmentation and layering method. By enabling each subscriber entity to have a pool of VRs across multiple POPs for its VPN, the system is able to support tens of thousands of discrete entities within a single platform.

Just like a traditional router, a VR has its own route-forwarding table. In addition, each VR manages a defined set of routing protocols and supports a number of interfaces. In one embodiment, VRs support not only physical interfaces, but also Virtual Interfaces (VIs). This enables communication between VRs within the same switch 12.

In one embodiment, each switch 12 can support up to 10,000 VRs per switch. Fundamentally, the system VR (ISPX VR) is no different than any other VR in its make-up. It differs from the other VRs, however, in that it is the router that aggregates traffic from all other VRs and forwards it out to another switch 12 or out to the Internet. By isolating the subscriber level VRs from a direct Internet adjacency, system 10 is able to minimize its complexity to one element in the system. In addition, the ISPX VR performs routing protocol isolation, for instance by interacting with the core via BGP-4, while running OSPF or RIP to a subscriber VR. It also allows the system to optimize resources, by keeping the subscriber VR routing tables small.

A virtual router performs functions similar to a real/normal router. One or more VR would be setup for a subscriber. And like a normal router, VR will route IP traffic for the assigned customer.

In one embodiment, virtual private networks (VPNs) are logical abstractions. Each VPN represents the logical part of network visible or associated with a subscriber or ISP. A VPN primarily comprises of Virtual Routers (VR) and Virtual Interfaces (VI). In one such embodiment, service and performance characteristics of a VPN are captured in a Service Level Agreement (SLA) associated with the VPN.

In one embodiment, a virtual router can have multiple interfaces associated with it. These interfaces are termed Virtual Network Connections (VNC) or Virtual Interfaces (VI). A VNC or VI corresponds to only one side of a network connection. Virtual Interfaces represent either connection end points for a subscriber or a connection between two virtual routers. A VI mostly captures the network layer properties of an interface (one example of such a property of a VI is its IP address). A VI is mapped to either a Logical Interface or another VI. In one such embodiment, each VNC/VI is characterized by bandwidth, latency, services, and a set of prioritized queues.

VI Bandwidth is measured in bits per second (bps) and is the average number of bits per second transmitted over the VI during a sampling interval. Maximum absolute bandwidth may be set to enforce QOS commitments first then use additional capacity for overflow burst traffic. VI bandwidth can be a multiple of 56 Kbps or 64 Kbps.

VNC/VI Services include Application Firewall, Packet Filter, Encryption, NAT, Tunnel Termination, Tunnel origination and authentication (identification of the Virtual RADIUS Server), certificate authority, Accounting. Multiple VNC Services may be configured for the same VNC, directly from the VPN Manager.

VNC/VI Queues are used to prioritize different traffic types within a VNC. Each VNC Queue is characterized by bandwidth, latency, and traffic type. The sum of the bandwidth allocated on all VNC Queues for a particular VNC is equal to the VNC Bandwidth for that VNC. IP data traffic authorized for a particular VPN Queue is identified by using one or more of the following parameters: Source IP Network Address, Destination IP Network Address, IP Protocol Type, Port # and the Differentiated Services Byte.

A VI may be mapped into a Logical Interface (LI). A LI can be a PPP link, a PVC or SVC of FrameRelay or ATM, a Ethernet or an IP tunnel etc. A LI may be mapped into a physical interface; it is not mandatory for every LI to be mapped to a physical interface.

In one embodiment, a subscriber's access to each VPN is captured using a Logical Interface (LI) terminating on an Access Blade port. One or more VRs are created and associated with a VPN to route subscribers IP traffic as per the subscriber requirements. In one embodiment, a subscriber's LI terminating on an Access Blade port is linked with a VR using a Virtual Interface (VI). One or more virtual network connections (VNCs) are associated with Vis to define subscriber's connectivity to the other end, which for example could be internet, intranet; subscribers regional office etc.

For instance, Internet Access VNCs may be used to connect a subscriber's VPN Router to the ISP's Internet backbone, thereby providing users at the subscriber premise with secure, dedicated Internet access.

VPN Intranet VNCs may be used to connect different subscriber locations securely across an IP backbone or the Internet.

VPN Extranet VNCs may be used to connect a subscriber's VPN Router to the VPN Router of another corporation or community of interest to allow access between the entities.

VPN RAS VNCs may be used to connect a subscriber's VPN router to an ISPs dial-up remote access server (such as Ascend MAX, Cisco 5800, etc.). The remote access servers (RAS) and/or the dial-in client initiates either a PPTP or L2TP tunnel to the Orion, with or without encryption.

Figure 5:
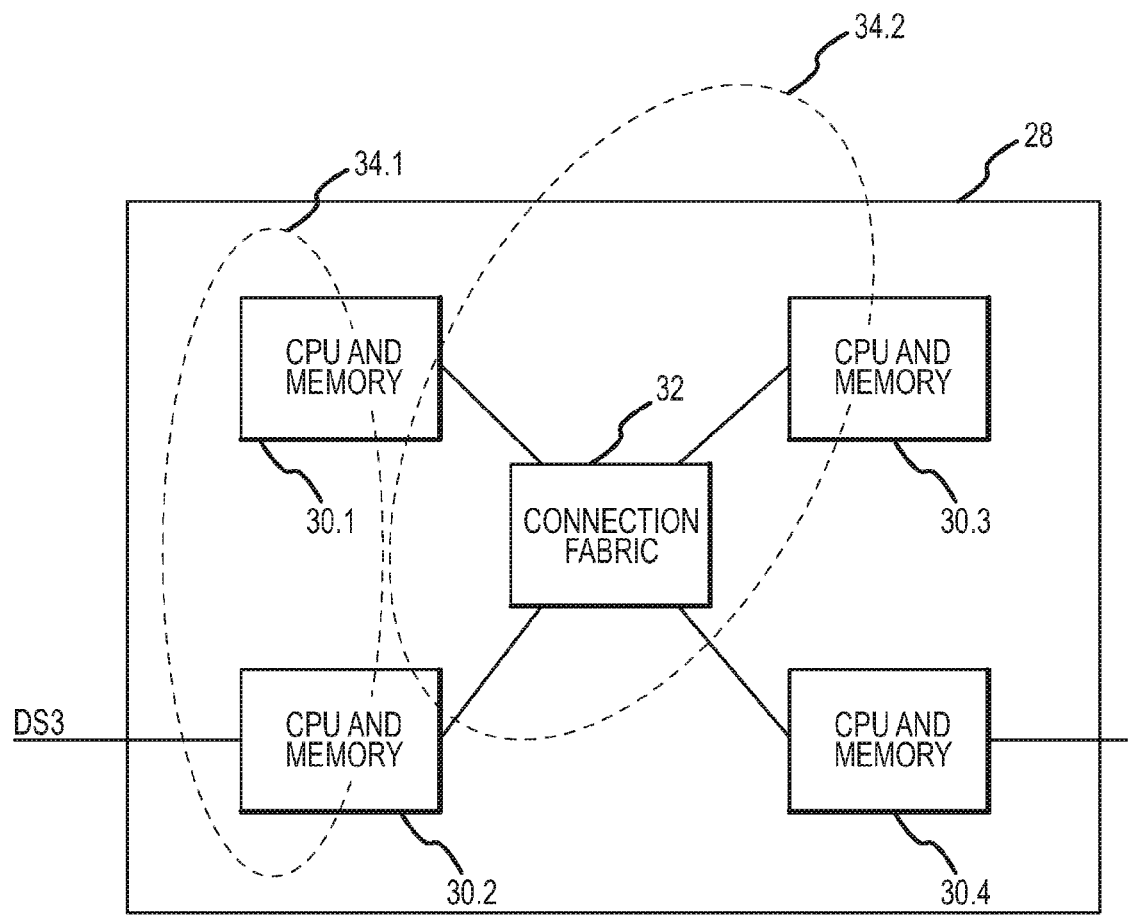
FIG. 5 conceptually illustrates an exemplary mapping of virtual routers onto processor elements.

The way that virtual routers map on processor elements can be understood in the context of FIG. 5. FIG. 5 shows a blade 28 having four processor elements (PEs) 30. Each processor element 30 includes a CPU and memory. In addition, each PE 30 is connected to the other PEs 30 and to the rest of switch 12 through connection fabric 32. In the embodiment shown in FIG. 5, two virtual routers 34 are mapped on blade 28. It should be noted that, in one embodiment, more than one virtual router can be mapped to a single PE 30, and vice versa. Blade 28 can, therefore, be a shred resource among two or more subscribers.

Figure 6:
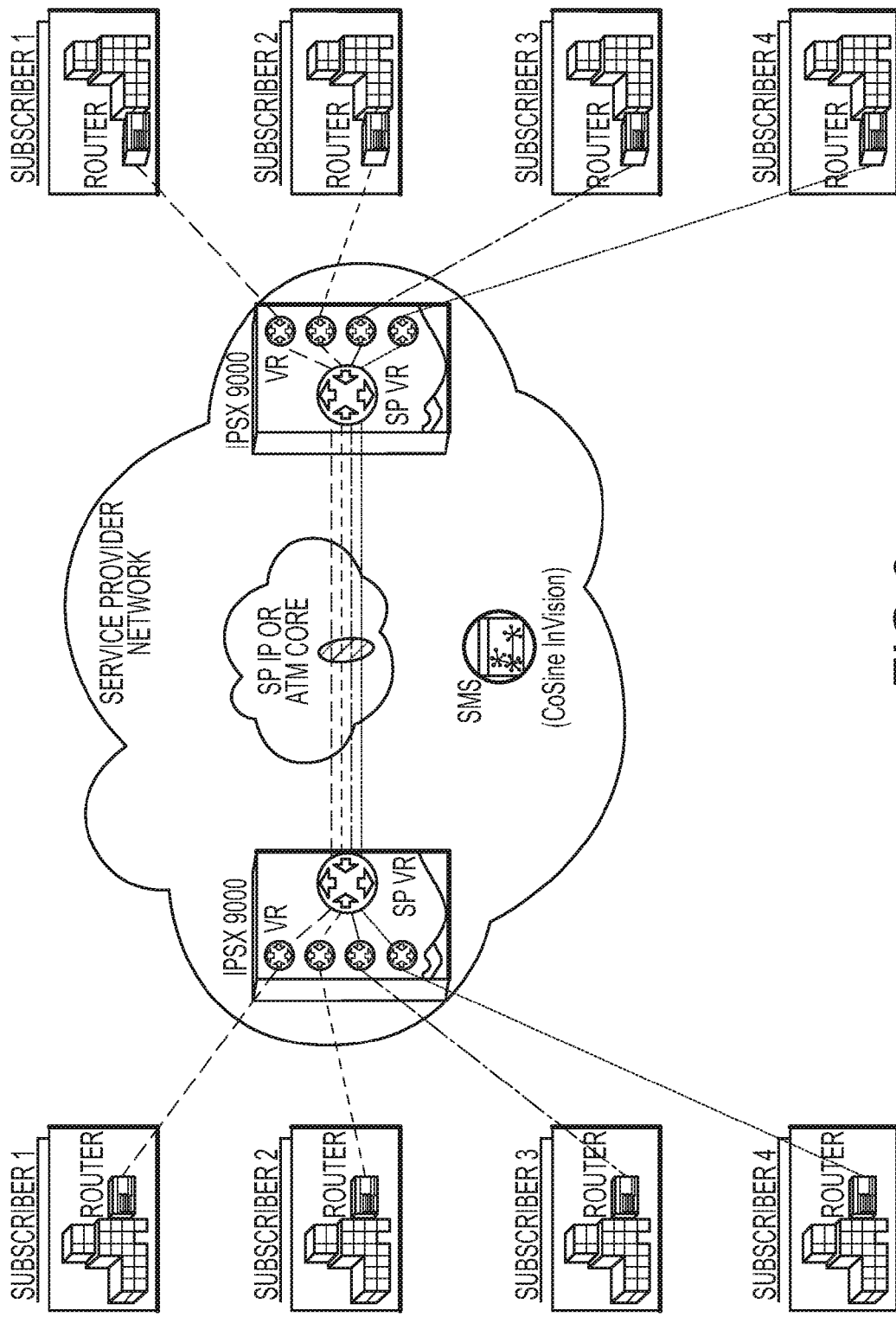
FIG. 6 conceptually illustrates segmentation of a switch across a number of different subscribers in accordance with an embodiment of the present invention.

The segmenting of switch 12 across a number of different subscribers is shown in FIG. 6.

In one embodiment, each VR is divided into a discrete object group, which has many functions and services associated with it; for instance routing, packet filtering and firewall each are individual objects. By being able to create a new object such as Network Address Translation (NAT), it is simply added as another part. of the object group and activated. This action can be achieved without making any changes to the physical configuration of the Service Blade supporting the VR and thus maintaining network uptime.

The configuration of Virtual Routers (VR) and their corresponding Virtual Interfaces (VI) provides the desired constraints (or paths) for packet flows and the permissible transformations (AKA services) of the packet flows. NOS 20 still, however, has to provide mechanisms to efficiently direct packets from ingress port through protocol stack to Application service thread. The OS also has to provide mechanisms to efficiently direct packets from Application service thread through protocol stack to egress port.

In one embodiment, the configured VR/VI system defines a semi-static topology within the device boundary (which hereafter is referred to as the Configured Topology). Based on traffic patterns, the configured topology could induce a dynamic topology comprising of shortcuts (which hereafter is referred to as the Flow Topology).

In one embodiment, flows strictly follow the configured paths. This results in inefficient utilization of inter-connect bandwidth, memory and CPU time. In another embodiment, NOS 20 supports a dynamic flow based topology as discussed below.

The nominal Protocol Stack configuration places topological constraints on packet flows. First, the standard protocol profile and related topology will be described. Then, the issues that arise when the protocol stack is distributed are described.

The following terms are used throughout:

"Packet Flow"—All packets with a common set of attributes comprises a packet flow. Depending on the attributes, the flow may be L3 or L4 flow.

"L3 Flow"—Only Layer 3 attributes are used to identify a packet flow. The Layer 3 attributes used are <Destination IP Address, Source IP Address, IP Protocol>.

"L4 Flow"—When possible, both Layer 3 and Layer 4 attributes are used to identify a packet flow. Typically, multiple L4 flows comprise a single L3 flow. If the IP Protocol is TCP or UDP the Layer 4 attributes used are <Destination Port, Source Port>.

"Routing Table"—A common table of routing information that is used by Routing Protocols (e.g. BGP, OSPF, ISIS, RIP). The entries are usually tagged with origin, routing protocol attributes etc. This is also known as RIB (Routing Information Base).

"Forwarding Table"—A table of best next-hop for prefixes, consulted in the packet forwarding function and derived from the Routing Table. This is also known as FIB (Forwarding Information Base).

"Configured Topology"—Given a Subscriber VR and its ISP VR, consider the associated graph. This graph's nodes are the PE's executing software/services and the edges of the graph are the communication links between the software/services. This graph is the configured topology.

"Flow Topology"—Based on the actual dynamic flow of L3 and L4 packets a graph of software/services and the communication links between the software/services can be constructed. This graph is the flow topology. The flow topology is derived from and would be a sub-graph of the configured topology if shortcuts are not employed. When shortcuts are employed, there is no direct graph theoretic correlation between the configured and flow topologies.

Topological Constraints Imposed by Protocol Stack

Figure 7:
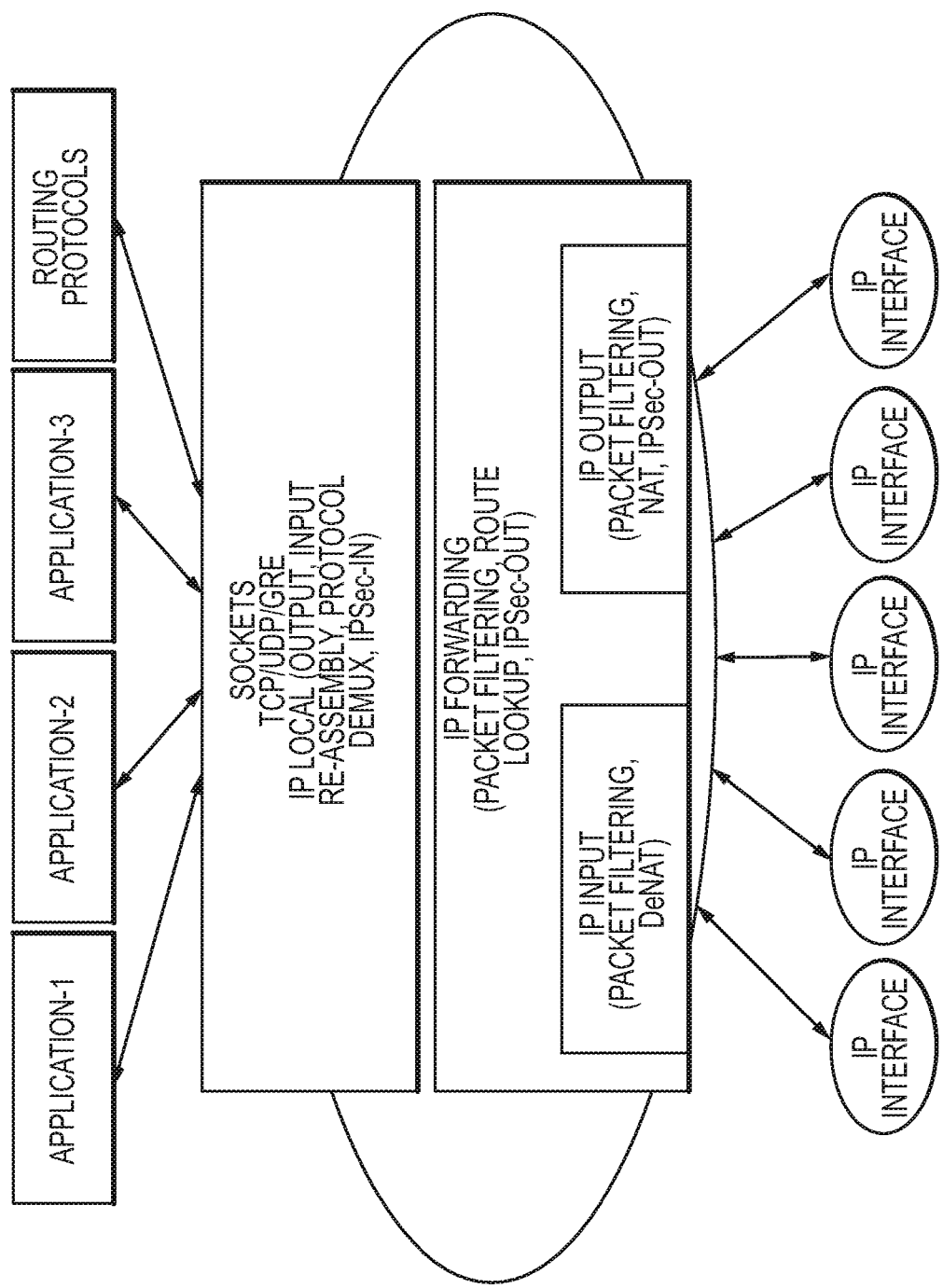
FIG. 7 is a block diagram illustrating two sub-layers of the network layer of the protocol stack in accordance with an embodiment of the present invention.

The Network layer is the loci of all packets received, sent or forwarded. Conceptually, the network layer (i.e. IP itself) can be thought of as being 2 sub-layers, namely the Forwarding and Local sub-layers. The functionality encompassed by the 2 IP sub-layers is shown in FIG. 7. IP Interfaces are the link service access points (LSAP in OSI-speak).

Traditional networking wisdom recommends: For IP, a packet flow is identified by <Source, Destination, Protocol>.

These will be referred to as L3 flows. These attributes of a packet are preserved across all packet fragments. Preserve the temporal order of L3 flows received on an IP Interface. This reduces the resequencing delay of stream based protocols (such as TCP). Many datagram based applications are intolerant of packet re-ordering (which is not unreasonable if the application is transported via a UDP tunnel without order preservation guarantees).

The IP Packet ID, which is critical for packet fragmentation and reassembly, should be unique within a L3 flow originating from local applications. (This is actually required by RFC-791, Section 2.3, page 8).

Traditional implementations generally impose stronger restrictions than required, by:

Ensuring strict temporal order across all L3 flows received on an IP Interface.

Ensuring unique IP Packet ID across all L3 flows originating from local applications. Packet forwarding needs to consult the Forwarding Table or Forwarding Information Base (FIB). Most implementations maintain a single forwarding table. High performance implementations typically maintain multiple synchronized instances of the forwarding table.

Figure 8:
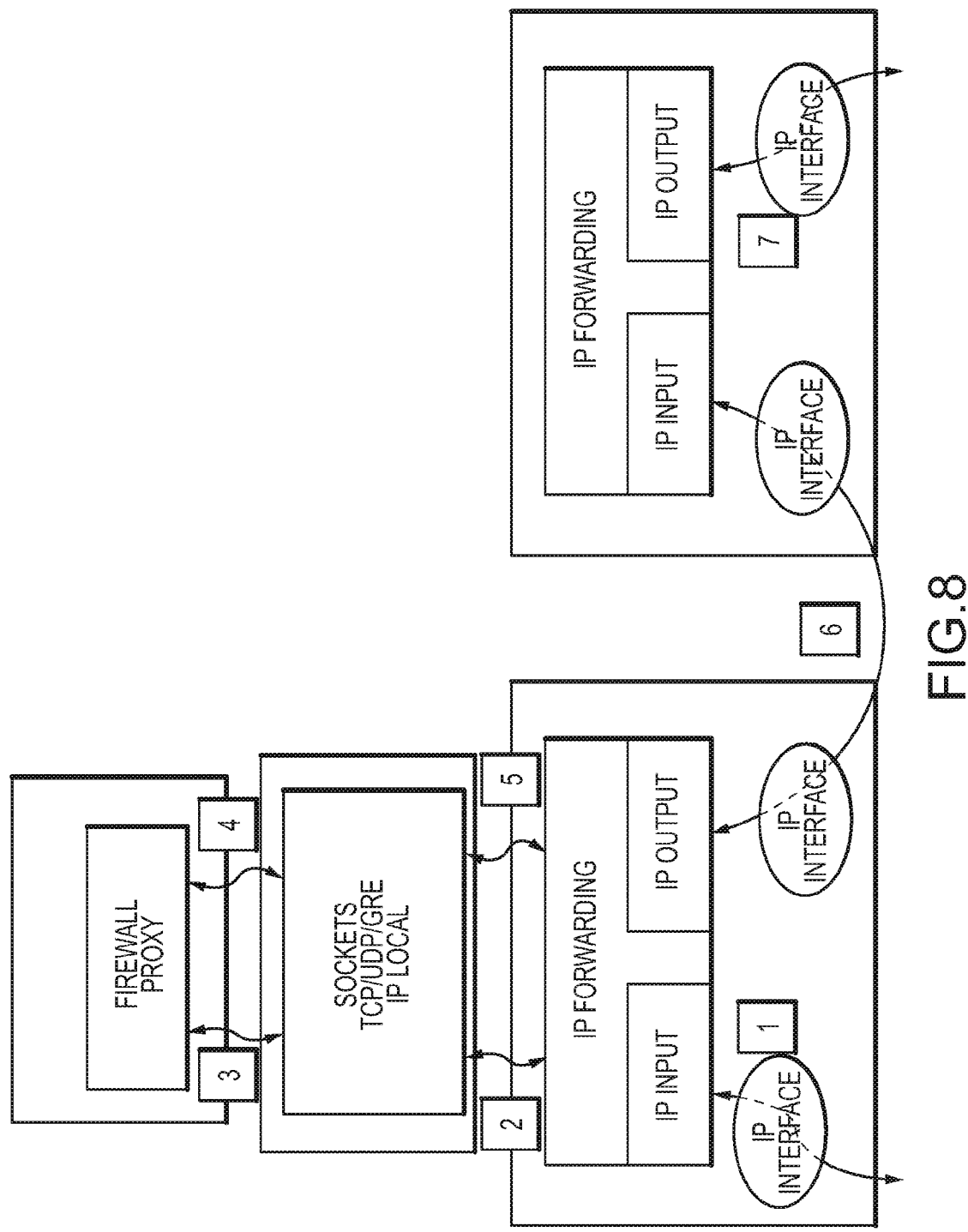
FIG. 8 conceptually illustrates inter-module transfers during firewall flow processing in accordance with an embodiment of the present invention.
Figure 10:
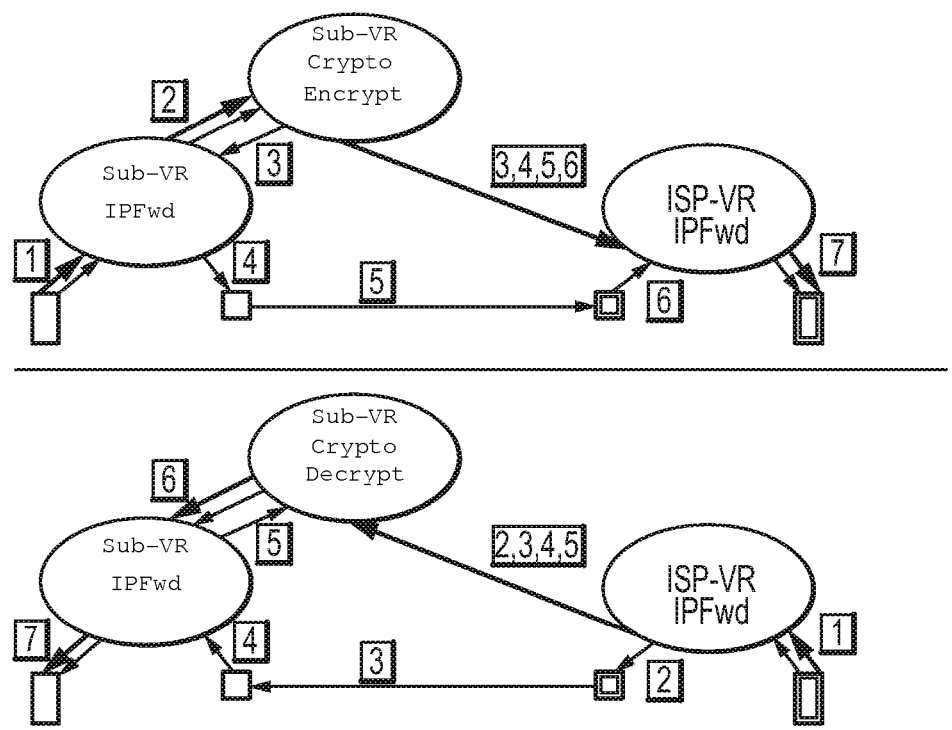
FIGS. 10, 11, 12 and 13 conceptually illustrate various forward and reverse flow scenarios in accordance with an embodiment of the present invention.
Figure 11:
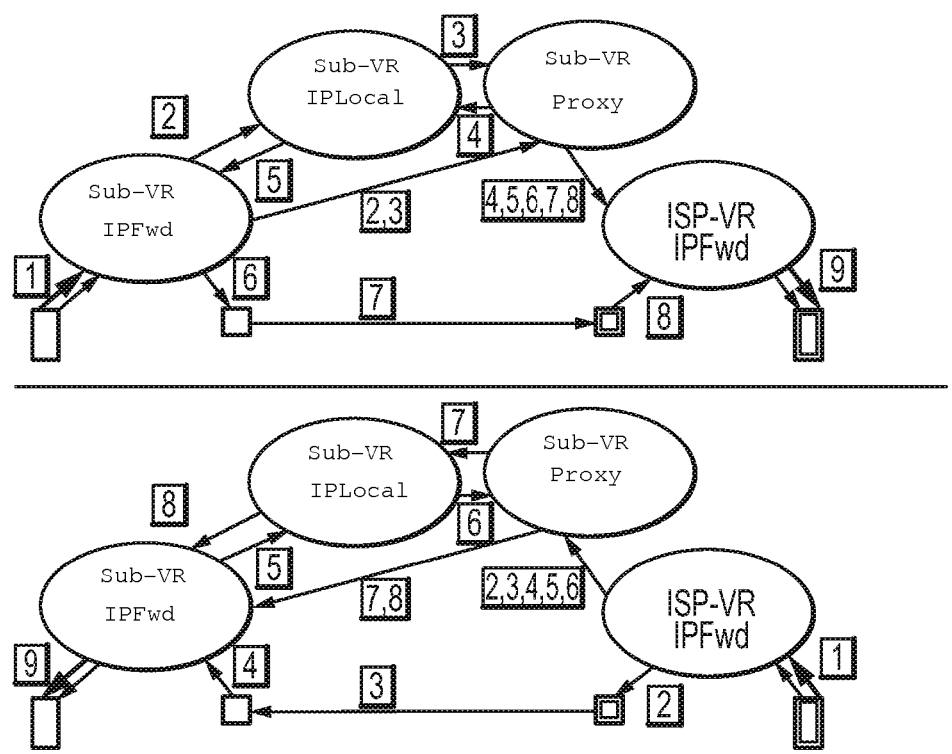
Figure 12:
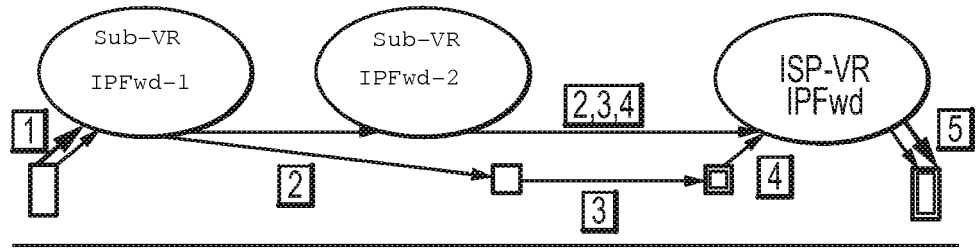
Figure 12:
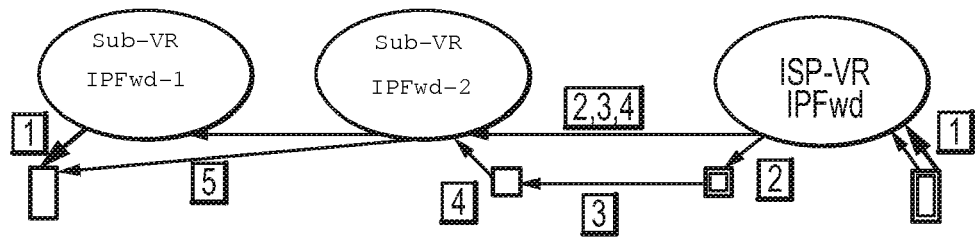
Figure 13:
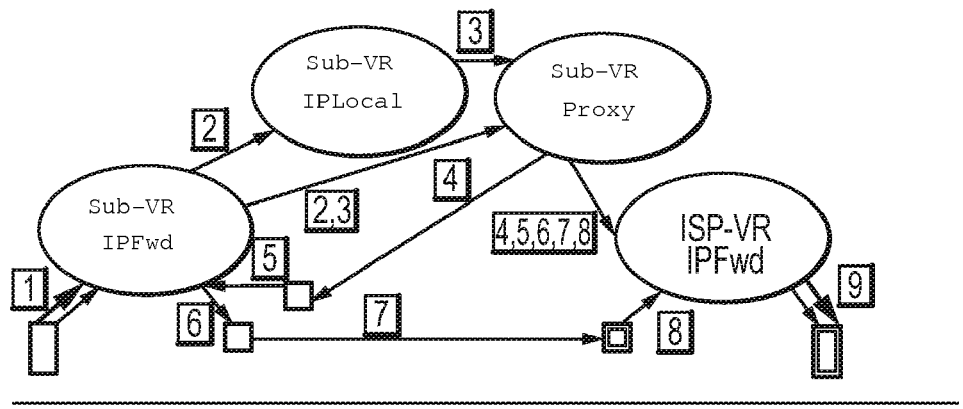
Figure 13:
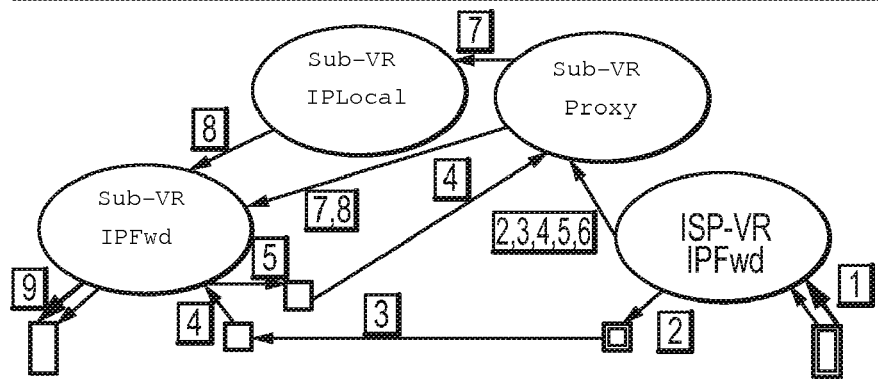

An example of what would happen in the context of IPNOS 1.x is now described for typical application flows. The inter-module transfers are shown in FIG. 8. The processing sequence is:

Packet is received from the subscriber line interface

Processed by IP Fwd module and passed to IP Local module

Demux'ed by IP Local and passed on to the Application

Application process data and sends transformed data

IP Local sends packet to subscriber

IP Fwd module Subscriber IP Fwd forwards it to ISP IP Fwd module

ISP IP Fwd module sends it to ISP line interface

Note that steps 2, 3, 4, 5, 6 require an inter-PE transfer. Each of these steps may represent a backplane crossing.

FIG. 9 shows the contents that can be used to determine a L4 packet flow when the packet is unfragmented (determined by the condition (MF==0 && Offset==0)). It also shows the contents that can be used to determine a L3 packet flow when the packet is fragmented.

When a packet gets fragmented, it should be noted that the ID field is preserved across all fragments of the packet. However, the receiver may receive the fragments in arbitrary order. Thus the receiver may only use <Source, Destination, Protocol> to determine the packet flow. The receiver can not create per packet flow state which uses the ID field to decide on the L4 flow for all fragments on the false assumption that the first fragment contains L4 information.

NOTE: All fragmented packets must be reassembled before the L4 flow can be inferred. This has implications for L4 oriented services like NAT. For NAT to work correctly, the gateway must reassemble every fragmented packet before it can perform its packet transformation. This is a tremendous burden and many NAT implementations (including IPSX) simply do not transform the fragments subsequent to the first.

There are several specific flows that are optimized in accordance with embodiments of the present invention. The forward flows are shown as originating at a Subscriber interface and ending at an ISP interface in the upper half of FIGS. 10-13. The reverse flow is shown in the lower half of each figure.

In one embodiment of NOS 20, objects communicate with each other in 1 of 2 ways—namely Object IOCTLs and Object Channels. The Object Channel is point-to-point (P-P), light weight inter-object communication transport. This maps well into the Configured Topology.

When shortcuts are created, an Object Channel termination will receive traffic from multiple Object Channel sources. Consequently, according to one embodiment, a multi-point-to-point (MP-P) Object Channel is used in the Flow Topology.

The essential idea behind the MP-P Object Channel is that MP-P can be constructed in parallel to the P-P Object Channel. This permits the co-existence of the 2 communication models. This is shown in FIG. 14.

Both ends of a P-P use the initialization function obj_init_channel( ). For MP-P, there will be 2 separate initialization functions. For MP-P transmit, the initialization function is obj_mpp_tx_init_channel( ). For MP-P receive, the initialization function is obj_mpp_rx_init_channel( ). There is also an anonymous mpp_send( ) function that can be used (and which is bound to the channel end point by obj_mpp_tx_init_channel( ) to send anonymously to a channel end point without using the Object Channel abstraction.

Figure 14:
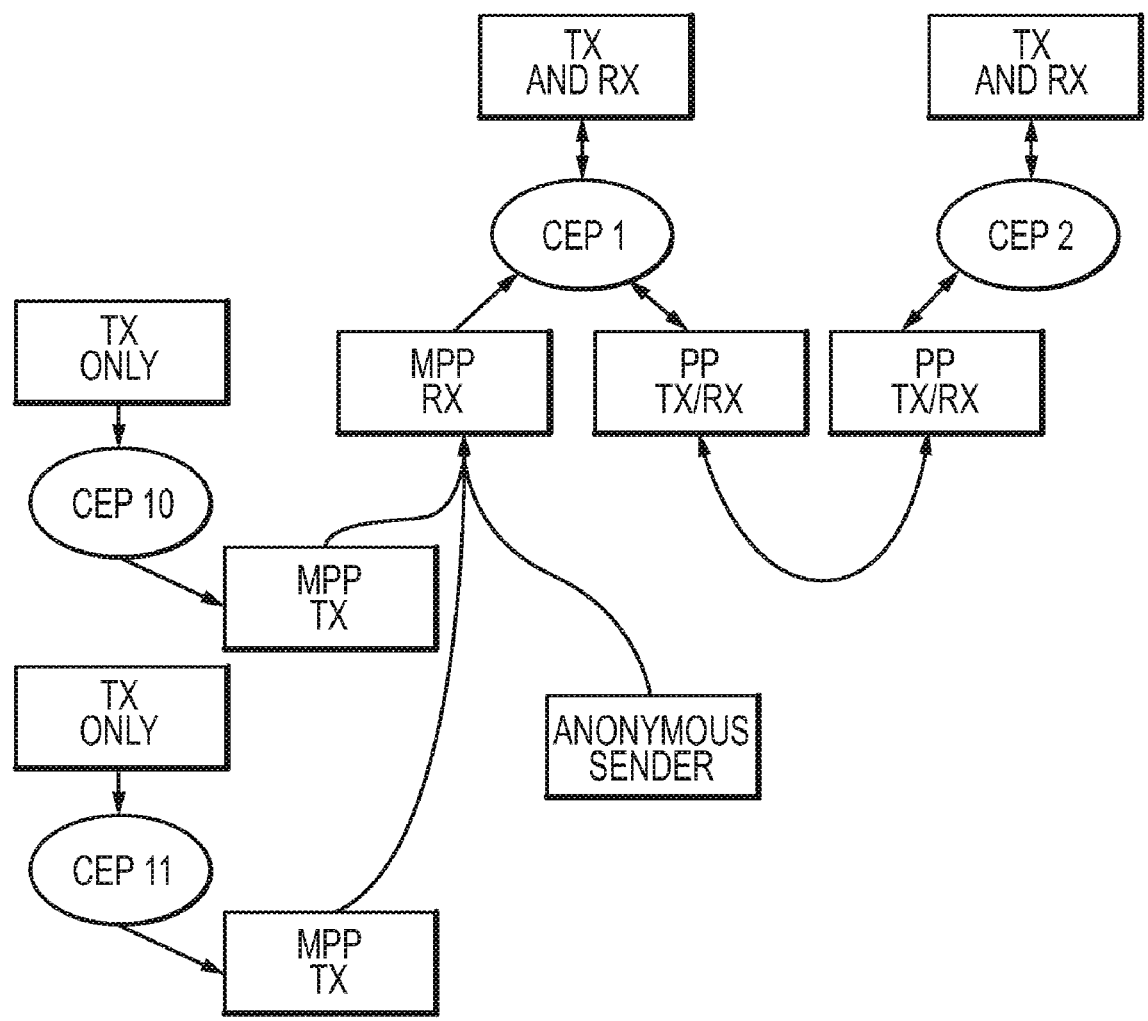
FIG. 14 conceptually illustrates multi-point-to-point (MP-P) operation in accordance with an embodiment of the present invention.

In FIG. 14, Object Channel End Point (CEP) of both P-P and MP-P are shown. CEP 1 is initialized as both an MP-P receiver and as a P-P receiver/sender. When CEP 1 was initialized as an MP-P receiver, it got assigned a globally unique address. CEP 2 is initialized solely as a P-P receiver/sender. CEP 10 and 11 are initialized as MP-P sender with target address of CEP 1's MP-P address. Note that a MP-P sender can not be initialized as a P-P receiver/sender. Additionally, modules that have CEP 1's MP-P address cans send anonymously.

Another approach is to use a replicated FIB. The IP Forwarding agent uses the Forwarding Information Base (FIB) to make its forwarding decision. When the Virtual Router (VR) terminates links on multiple blades, the VR has to have multiple IP Forwarding agents. This requires the IP Forwarding agents to maintain a Replicated FIB. This feature has been referred to variously as Multi-FIB, Distributed FIB and Split FIB . . . none of which reflects the actual operation.

The Replicated FIB need not be constrained to only IP Forwarding agents within a VR. A Replicated FIB may be used by other objects of a VR to make forwarding decisions to support shortcuts.

It should be noted that there are a host other data structures that also may be replicated. These are Packet Filters (PF) (both dynamic and static), the Security Policy Database (SPD) and Security Association Database (SAD), and Network Address Translation (NA T) tables. Another approach is to use a Distributed Protocol Stack. FIG. 8 shows one possible functional decomposition of NOS 20 functionally distributed protocol stack. The functional decomposition simply cuts the protocol stack at convenient horizontal planes with no duplication of function.

To support a Flow Topology, a different functional decomposition of the protocol stack is required. This will duplicate functionality in multiple objects. Table 1 contrasts the assignment of functionality to objects under the two models of Distributed Protocol Stack. It is a logical extension of the VR flow cache that is employed to speed up packet forwarding. It must be noted at the outset that this solution is significantly more complex than any previous proposals. Unfortunately, there does not seem to be any less complex solution available.

TABLE 1

Functional Decomposition of Distributed Protocol Stacks

| Objects in VR | IPNOS 1.1 Distributed Protocol Stack (Configured Topology) | Proposed Distributed Protocol Stack (Flow Topology) |
| --- | --- | --- |
| IP Forwarding | IP input, IP output, IP Forwarding, IP Reassembly (ESP and AH only), IP Demux (ESP and AH only) | IP input, IP output, IP Forwarding, IP Reassembly (ESP and AH only), IP Demux (ESP and AH only) |
| IP Local | IP Reassembly, IP receive and send, IP Demux, TCP, UDP, GRE, Socket Lower, Routing protocols | IP input, IP output, IP Reassembly, IP receive and send, I P Demux, TCP, UDP, GRE, Socket Lower, Routing protocols |
| Crypto | Crypto services | IP input, IP output, IP Forwarding, IP Reassembly (ESP and AH only), IP Demux (ESP and AH only), Crypto services |
| Socket Upper | Socket Upper | IP input, IP output, IP Reassembly, IP receive and send, IP Demux, TCP, UDP, GRE, Socket Lower, Socket Upper |
| Application | Application | Application |

In the Flow based model, there are multiple objects that implement the IP functions. This requires that the FIB be replicated not only at the IP Forwarding object, but also in a host of other objects that implement the IP Forwarding layer functionality.

In one embodiment, Object Manager 24 consists of three layers as shown on FIG. 4. The upper layer titled OM Controller and Database (OMCD) 40 is concerned with managing the VPN and VR configuration. This is the agent that deals with the configuration manager directly. Middle layer 42 entitled OM Object Routing and Interface Global is concerned with managing global (across the switch system) object groups and object configurations. Lower layer 44 entitled OM Object Routing and Interface (OMORI) is concerned with managing local objects and groups as well as routing control information between address spaces based on the location of objects, and interfacing with the object via method invocation.

In one embodiment, the IPSX object database consists of two types of databases: Global (managed on Master Control Blade by OMORIG) and distributed local databases (managed by OMORI agents on every PE present in the system). In one such embodiment, the global database is a superset of the extracts from local databases.

Objects represent a basic unit of management for purposes of fault tolerance, computational load balancing, etc. One or more adjacent protocol modules can be placed into a single object. It is also possible that a module is split across two objects.

In one embodiment, a configuration management system connected to OMCD 40 is used to configure the VPNs and VRs as shown in Appendix A and is described in "System and Method for Configuration Management", filed herewith, the description of which is incorporated herein by reference.

In one embodiment, instead of deploying CPE firewalls remotely at the enterprise subscriber site, System 10 provides Network Associates, Incorporated's (NAI's) Gauntlet Application Proxy Firewalls from the SP POP where they can be centrally managed and supported. NOS 20 is the foundation that enables third-party applications like Gauntlet to be delivered on switch 12.

The application proxy firewall model offers far superior security control because it provides full application-level awareness of attempted connections by examining everything at the highest layer of the protocol stack.

Once NAI's Gauntlet Application Proxy Firewall is configured, it offers the most robust form of access control on the market. Gauntlet lets access control policies to be established at Layer 7 and thus enables specific application-based rules to be made. For instance, users coming into the network from the Internet are allowed to do an FTP "get," but not a "put." Additionally, because the Gauntlet firewall is a proxy solution that acts as the intermediary, preventing the end-stations from communicating directly with the firewall. As a result, this solution offers significantly better protection against OS directed denial of service attacks. Another important aspect of the Application Proxy Firewall is the incremental services provided by switch 12 such as Intrusion Detection and Anti-virus scanning, which are not available in firewall application models such as stateful inspection.

Figure 15:
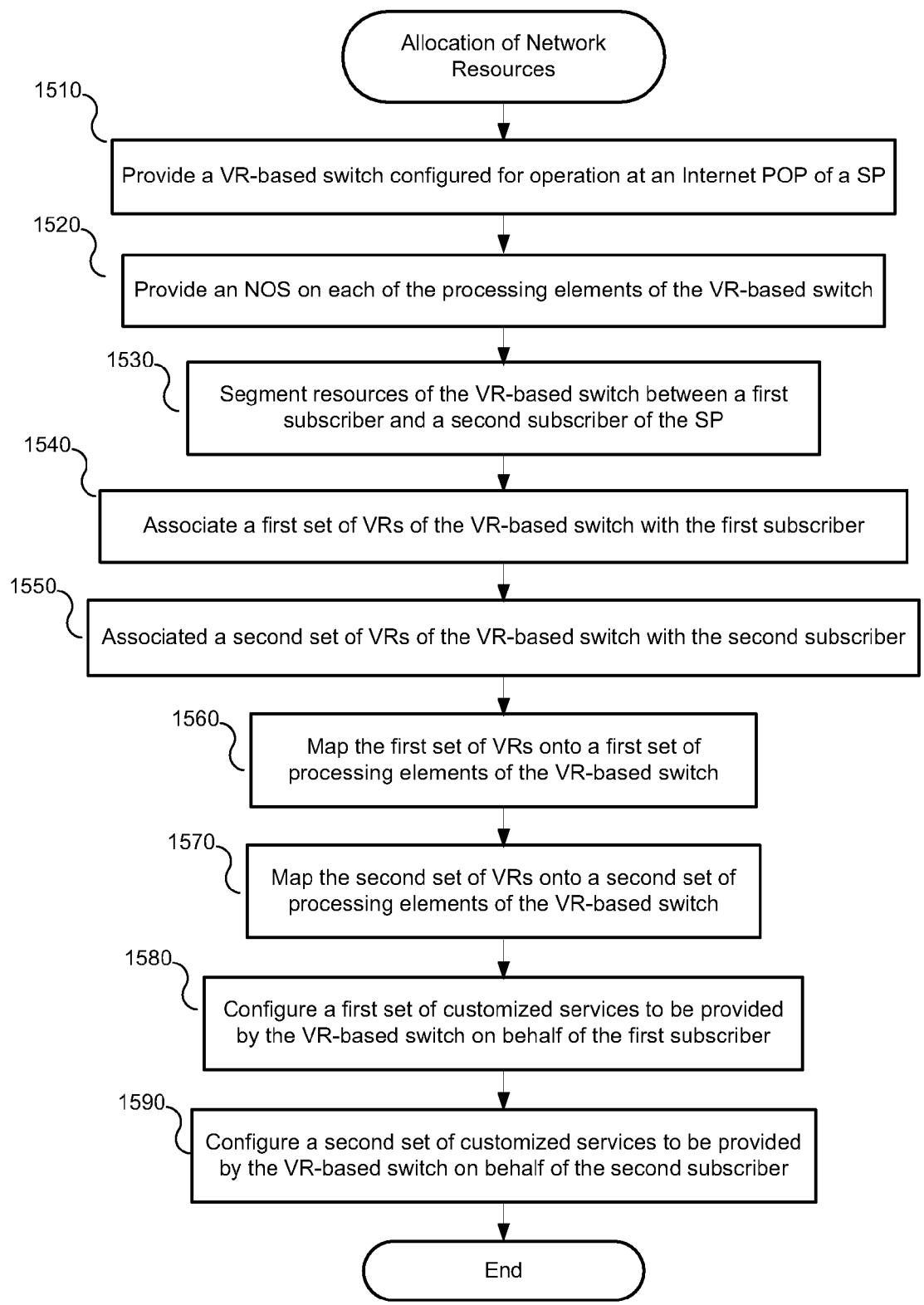
FIG. 15 is a flow diagram illustrating a process of allocating network resources in accordance with an embodiment of the present invention.

FIG. 15 is a flow diagram illustrating a process of allocating network resources in accordance with an embodiment of the present invention. At block 1510, a virtual router (VR)-based switch configured for operation at an Internet point-of-presence (POP) of a service provider is provided.

At block 1520, a network operating system (NOS) is provided on each of the processing elements of the VR-based switch.

At block 1530, resources of the VR-based switch are segmented among multiple subscribers. In the present example, the resources are segmented between a first subscriber of the service provider and a second subscriber of the service provider.

At block 1540, a first set of VRs of the VR-based switch are associated with the first subscriber.

At block 1550, a second set of VRs of the VR-based switch are associated with the second subscriber. In one embodiment, a system VR is defined within the VR-based switch. In such an embodiment, the system VR may aggregate traffic from the first set of VRs and the second set of VRs and transfer the aggregated traffic across the Internet. At block 1560, the first set of VRs are mapped onto a first set of processing elements (PEs) of the VR-based switch.

At block 1560, the first set of VRs are mapped onto a first set of PEs of the VR-based switch. According to one embodiment, at least one of the first set of VRs spans two or more of the PEs of the VR-based switch.

At block 1570, the second set of VRs are mapped onto a second set of PEs of the VR-based switch. In one embodiment, a shared processing element is part of the first set of PEs and the second set of PEs. According to one embodiment, at least one of the second set of VRs spans two or more of the PEs of the VR-based switch.

At block 1580, a first set of customized services is configured to be provided by the VR-based switch on behalf of the first subscriber. According to one embodiment, a first service object group is allocated to the first set of VRs. The first service object group may include a service object corresponding to each service of the first set of customized services and the service objects may be dynamically distributed by the NOS to customized processors of the first set of PEs to achieve desired computational support. In one embodiment, the first set of customized services includes various combinations of firewalling, virtual private networking, encryption, traffic shaping, routing and network address translation (NAT).

At block 1590, a second set of customized services is configured to be provided by the VR-based switch on behalf of the second subscriber. According to one embodiment, a second service object group is allocated to the second set of VRs. The second service object group may include a service object corresponding to each service of the second set of customized services and the service objects may be dynamically distributed by the NOS to customized processors of the second set of PEs to achieve desired computational support. In one embodiment, the second set of customized services includes various combinations of firewalling, virtual private networking, encryption, traffic shaping, routing and network address translation (NAT).

In one embodiment, a first configured topology is defined among the first set of VRs by configuring virtual interfaces (VIs) of the first set of VRs to provide desired paths for packet flows associated with the first subscriber and permissible transformations of the packet flows associated with the first subscriber.

In one embodiment, a second configured topology is defined among the second set of VRs by configuring virtual interfaces (VIs) of the second set of VRs to provide desired paths for packet flows associated with the second subscriber and permissible transformations of the packet flows associated with the second subscriber.

CONCLUSION

In one embodiment, the service provider's security staff consults with the customer in order to understand the corporate network infrastructure and to develop appropriate security policies (Note: this is a similar process to the CPE model). Once this has been accomplished, the NOC security staff remotely accesses the IP Service Processing Switch (using the Service Management System) at the regional POP serving the enterprise customer, and the firewall service is provisioned and configured remotely. Such a model enables the service provider to leverage the enterprise's existing services infrastructure (leased lines and Frame Relay PVCs) to deliver new, value-added services without the requirement of a truck roll. All firewall and VPN functionality resides on the IP Service Processing Switch at the POP, thus freeing the service provider from onsite systems integration and configuration and effectively hiding the technology from the enterprise customer. Firewall inspection and access control functions, as well as VPN tunneling and encryption, take place at the IP Service Processing Switch and across the WAN, while the enterprise's secure leased line or Frame Relay PVC access link remains in place. The customer interface is between its router and the IP Service Processing Switch (acting as an access router), just as it was prior to the rollout of the managed firewall service. Additionally, the customer has visibility into and control over its segment of the network via the CNM that typically resides at the headquarters site.

The network-based firewall model also enables service providers to quickly and cost-effectively roll out managed firewall solutions at all enterprise customer sites. As a result, secure Internet access can be provided to every site, eliminating the performance and complexity issues associated with backhauling Internet traffic across the WAN to and from a centralized secure access point. As the IP Service Delivery Platform is designed to enable value-added public network services, it is a carrier-grade system that is more robust and higher-capacity than traditional access routers, and an order of magnitude more scaleable and manageable than CPE-based systems. The platform's Service Management System enables managed firewall services, as well as a host of other managed network services, to be provisioned, configured, and managed with point-and-click simplicity, minimizing the need for expensive, highly skilled security professionals and significantly cutting service rollout lead-times. The Service Management System is capable of supporting a fleet of IP Service Processing Switches and tens of thousands of enterprise networks, and interfaces to the platform at the POP from the NOC via IP address. Support for incremental additional platforms and customers is added via modular software add-ons. Services can be provisioned via the SMS system's simple point and click menus, as well as requested directly by the customer via the CNM system. Deployment of a robust IP Service Delivery Platform in the carrier network enables service providers to rapidly turn-up high value, managed network-based services at a fraction of the capital and operational costs of CPE-based solutions. This enables service providers to gain a least-cost service delivery and support structure. Additionally, it enables them to gain higher margins and more market share than competitors utilizing traditional service delivery mechanisms— even while offering managed firewall services at a lower customer price point.

As enterprise customers gain confidence in the WAN providers' ability to deliver managed firewall services, a more scaleable and cost-effective service delivery model must be employed. Moving the intelligence of the service off of the customer premises and into the WAN is an effective strategy to accomplish this. Managed, network-based firewall services provide the same feature/functionality of a CPE-based service while greatly reducing capital and operational costs, as well as complexity.

The managed, network-based firewall service model enables WAN service providers to minimize service creation and delivery costs. This model virtually eliminates the need for onsite installation, configuration, and troubleshooting truck rolls, drastically reducing operational costs. This lower cost structure creates opportunities to increase revenues and/or gain market share by value-pricing the service. Services can be rapidly provisioned via a centralized services management system, shortening delivery cycles and enabling service providers to begin billing immediately. Additional services can be rapidly crafted and deployed via the same efficient delivery mechanism.

The network-based service model is a rapid and cost-effective way for service providers to deploy high-value managed firewall solutions. This model requires a comprehensive service delivery platform consisting of robust network hardware, an intelligent and scaleable services management system, and a feature-rich Customer Network Management (CNM) tool to mitigate customers' fears of losing control of network security.

In the above discussion and in the attached appendices, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method comprising:
providing a virtual router (VR)-based switch configured for operation at an Internet point-of-presence (POP) of a service provider, the VR-based switch having a plurality of processing elements;
providing a network operating system (NOS) on each of the plurality of processing elements;
segmenting resources of the VR-based switch between at least a first subscriber of the service provider and a second subscriber of the service provider by:
associating a first plurality of VRs with the first subscriber;
associating a second plurality of VRs with the second subscriber;
mapping the first plurality of VRs onto a first set of one or more of the plurality of processing elements;
mapping the second plurality of VRs onto a second set of one or more of the plurality of processing elements;
wherein a shared processing element of the plurality of processing elements is part of the first set of one or more of the plurality of processing elements and the shared processing element is part of the second set of one or more of the plurality of processing elements;
configuring a first set of customized services including a plurality of firewalling, virtual private networking, encryption, traffic shaping, routing and network address translation (NAT) to be provided by the VR-based switch on behalf of the first subscriber by allocating a first service object group within the first plurality of VRs, the first service object group including a service object corresponding to each service of the first set of customized services and wherein each service object of the first service object group can be dynamically distributed by the NOS to customized processors of the first set of one or more of the plurality of processing elements to achieve desired computational support; and
configuring a second set of customized services including a plurality of firewalling, virtual private networking, encryption, traffic shaping, routing and NAT to be provided by the VR-based switch on behalf of the second subscriber by allocating a second service object group within the second plurality of VRs, the second service object group including a service object corresponding to each service of the second set of customized services and wherein each service object of the second service object group can be dynamically distributed by the NOS to customized processors of the second set of one or more of the plurality of processing elements to achieve desired computational support.

2. The method of claim 1, further comprising:
defining a system VR within the VR-based switch; and
the system VR aggregating traffic from the first plurality of VRs and the second plurality of VRs and transferring the aggregated traffic across the Internet.

3. The method of claim 1, wherein at least one of the first plurality of VRs spans two or more of the first set of one or more of the plurality of processing elements.

4. The method of claim 2, wherein at least one of the second plurality of VRs spans two or more of the second set of one or more of the plurality of processing elements.

5. The method of claim 1, further comprising defining a first configured topology among the first plurality of VRs by configuring virtual interfaces (VIs) of the first plurality of VRs to provide desired paths for packet flows associated with the first subscriber and permissible transformations of the packet flows associated with the first subscriber.

6. The method of claim 5, further comprising defining a second configured topology among the second plurality of VRs by configuring virtual interfaces (VIs) of the second plurality of VRs to provide desired paths for packet flows associated with the second subscriber and permissible transformations of the packet flows associated with the second subscriber.

7. The method of claim 1, wherein the VR-based switch includes a first server blade and a second server blade and each of the plurality of processing elements are associated with the first server blade or the second server blade, and wherein a VR of the first plurality of VRs terminates links on both the first server blade and the second server blade, and the method further comprises forwarding agents associated with the VR maintaining a replicated forwarding information base.

8. A method comprising:
providing a virtual router (VR)-based switch within a service provider network, the VR-based switch having a plurality of processing elements;
providing a network operating system (NOS) on each of the plurality of processing elements;
segmenting resources of the VR-based switch between at least a first subscriber of the service provider and a second subscriber of the service provider by:
associating a first VR with the first subscriber;
associating a second VR with the second subscriber;
mapping the first VR onto a first set of two or more of the plurality of processing elements;
mapping the second VR onto a second set of two or more of the plurality of processing elements;
wherein the first set of two or more of the plurality of processing elements and the second set of two or more of the plurality of processing elements have at least one processing element of the plurality of processing elements in common;
configuring a first set of customized services including a plurality of firewalling, virtual private networking, encryption, traffic shaping, routing and network address translation (NAT) to be provided by the VR-based switch on behalf of the first subscriber by allocating a first service object group within the first VR, the first service object group including a service object corresponding to each service of the first set of customized services and wherein each service object of the first service object group can be dynamically distributed by the NOS among processors associated with the first set of two or more of the plurality of processing elements to achieve desired computational support; and
configuring a second set of customized services including a plurality of firewalling, virtual private networking, encryption, traffic shaping, routing and NAT to be provided by the VR-based switch on behalf of the second subscriber by allocating a second service object group within the second VR, the second service object group including a service object corresponding to each service of the second set of customized services and wherein each service object of the second service object group can be dynamically distributed by the NOS among processors associated with the second set of two or more of the plurality of processing elements to achieve desired computational support.

9. The method of claim 8, further comprising defining desired paths through the VR-based switch for packet flows associated with the first VR by configuring one or more virtual interfaces (VIs) of the first VR.

10. The method of claim 8, further comprising defining permissible transformations of packet flows associated with the first VR by configuring one or more VIs of the first VR.

11. The method of claim 8, wherein the VR-based switch includes a first server blade and a second server blade and each of the plurality of processing elements are associated with the first server blade or the second server blade, and wherein the first VR terminates links on both the first server blade and the second server blade, and the method further comprises forwarding agents associated with the first VR maintaining a replicated forwarding information base.

12. A method comprising:
providing a virtual router (VR)-based switch configured for operation at an Internet point-of-presence (POP) of a service provider, the VR-based switch having a plurality of processing elements and including a first server blade and a second server blade and each of the plurality of processing elements are associated with the first server blade or the second server blade;
providing a network operating system (NOS) on each of the plurality of processing elements;
segmenting resources of the VR-based switch between at least a first subscriber of the service provider and a second subscriber of the service provider by:
associating a first plurality of VRs with the first subscriber;
associating a second plurality of VRs with the second subscriber;
mapping the first plurality of VRs onto a first set of one or more of the plurality of processing elements, wherein a VR of the first plurality of VRs terminates links on both the first server blade and the second server blade;
mapping the second plurality of VRs onto a second set of one or more of the plurality of processing elements;
configuring a first set of customized services including a plurality of firewalling, virtual private networking, encryption, traffic shaping, routing and network address translation (NAT) to be provided by the VR-based switch on behalf of the first subscriber by allocating a first service object group within the first plurality of VRs, the first service object group including a service object corresponding to each service of the first set of customized services and wherein each service object of the first service object group can be dynamically distributed by the NOS to customized processors of the first set of one or more of the plurality of processing elements to achieve desired computational support;
configuring a second set of customized services including a plurality of firewalling, virtual private networking, encryption, traffic shaping, routing and NAT to be provided by the VR-based switch on behalf of the second subscriber by allocating a second service object group within the second plurality of VRs, the second service object group including a service object corresponding to each service of the second set of customized services and wherein each service object of the second service object group can be dynamically distributed by the NOS to customized processors of the second set of one or more of the plurality of processing elements to achieve desired computational support; and
forwarding agents associated with the VR maintaining a replicated forwarding information base.

13. The method of claim 12, further comprising:
defining a system VR within the VR-based switch; and
the system VR aggregating traffic from the first plurality of VRs and the second plurality of VRs and transferring the aggregated traffic across the Internet.

14. The method of claim 12, wherein at least one of the first plurality of VRs spans two or more of the first set of one or more of the plurality of processing elements.

15. The method of claim 14, wherein at least one of the second plurality of VRs spans two or more of the second set of one or more of the plurality of processing elements.

16. The method of claim 12, further comprising defining a first configured topology among the first plurality of VRs by configuring virtual interfaces (VIs) of the first plurality of VRs to provide desired paths for packet flows associated with the first subscriber and permissible transformations of the packet flows associated with the first subscriber.

17. The method of claim 16, further comprising defining a second configured topology among the second plurality of VRs by configuring virtual interfaces (VIs) of the second plurality of VRs to provide desired paths for packet flows associated with the second subscriber and permissible transformations of the packet flows associated with the second subscriber.

18. A method comprising:
providing a virtual router (VR)-based switch within a service provider network, the VR-based switch having a plurality of processing elements and including a first server blade and a second server blade and each of the plurality of processing elements are associated with the first server blade or the second server blade;
providing a network operating system (NOS) on each of the plurality of processing elements;
segmenting resources of the VR-based switch between at least a first subscriber of the service provider and a second subscriber of the service provider by:
associating a first VR with the first subscriber;
associating a second VR with the second subscriber;
mapping the first VR onto a first set of two or more of the plurality of processing elements, wherein the first VR terminates links on both the first server blade and the second server blade;
mapping the second VR onto a second set of two or more of the plurality of processing elements;
configuring a first set of customized services including a plurality of firewalling, virtual private networking, encryption, traffic shaping, routing and network address translation (NAT) to be provided by the VR-based switch on behalf of the first subscriber by allocating a first service object group within the first VR, the first service object group including a service object corresponding to each service of the first set of customized services and wherein each service object of the first service object group can be dynamically distributed by the NOS among processors associated with the first set of two or more of the plurality of processing elements to achieve desired computational support;
configuring a second set of customized services including a plurality of firewalling, virtual private networking, encryption, traffic shaping, routing and NAT to be provided by the VR-based switch on behalf of the second subscriber by allocating a second service object group within the second VR, the second service object group including a service object corresponding to each service of the second set of customized services and wherein each service object of the second service object group can be dynamically distributed by the NOS among processors associated with the second set of two or more of the plurality of processing elements to achieve desired computational support; and forwarding agents associated with the first VR maintaining a replicated forwarding information base.

19. The method of claim 18, further comprising defining desired paths through the VR-based switch for packet flows associated with the first VR by configuring one or more virtual interfaces (VIs) of the first VR.

20. The method of claim 18, further comprising defining permissible transformations of packet flows associated with the first VR by configuring one or more virtual interfaces (VIs) of the first VR.

* * * * *